(12) United States Patent
McKillop et al.

(10) Patent No.: US 9,367,151 B2
(45) Date of Patent: Jun. 14, 2016

(54) TOUCH PAD WITH SYMBOLS BASED ON MODE

(71) Applicant: Apple Inc., Cupertino, CA (US)

(72) Inventors: Chris McKillop, Los Gatos, CA (US); Andrew Grignon, Campbell, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/166,784

(22) Filed: Jan. 28, 2014

(65) Prior Publication Data

US 2014/0192001 A1    Jul. 10, 2014

Related U.S. Application Data

(63) Continuation of application No. 11/591,752, filed on Nov. 1, 2006.

(60) Provisional application No. 60/755,656, filed on Dec. 30, 2005.

(51) Int. Cl.
*G06F 3/00* (2006.01)
*G06F 3/0354* (2013.01)
(Continued)

(52) U.S. Cl.
CPC ............ *G06F 3/03547* (2013.01); *G06F 3/041* (2013.01); *G06F 3/0416* (2013.01); *G06F 3/0485* (2013.01); *G06F 3/04886* (2013.01); *G06F 2203/0338* (2013.01)

(58) Field of Classification Search
CPC .................................................. G06F 3/03547
USPC ......................................................... 345/156
See application file for complete search history.

(56) References Cited

U.S. PATENT DOCUMENTS 1,061,578 A    5/1913    Wischhusen et al.
2,063,276 A    12/1936    Thomas
(Continued)

FOREIGN PATENT DOCUMENTS

CA    2 597 500    8/2006
CN    1139235 A    1/1997
(Continued)

OTHER PUBLICATIONS

"About Quicktip®" www.logicad3d.com/docs/qt.html, downloaded Apr. 8, 2002.
(Continued)

*Primary Examiner* — Amare Mengistu
*Assistant Examiner* — Joseph G Rodriguez
(74) *Attorney, Agent, or Firm* — Morrison & Foerster LLP

(57) ABSTRACT

A multifunctional handheld device capable of operating in different modes includes a single input arrangement that provides inputs for each mode of the multifunctional handheld device. The single input arrangement includes at least an input pad that provides signals when touched or pressed. The input pad may for example be a touch pad. The input pad is divided into one or more input areas that change in accordance with the current mode of the multifunctional handheld device. The multifunctional handheld device also includes a display device that presents graphical elements to indicate the configuration of the input areas at the input pad. Each mode of the multifunctional handheld device provides a different configuration of input areas and graphical elements associated therewith.

20 Claims, 12 Drawing Sheets

(51) Int. Cl.
*G06F 3/041* (2006.01)
*G06F 3/0488* (2013.01)
*G06F 3/0485* (2013.01)

(56) References Cited

U.S. PATENT DOCUMENTS

| | | |
|---|---|---|
| 2,903,229 A | 2/1956 | Landge |
| 2,794,861 A | 6/1957 | Heine |
| 2,798,907 A | 7/1957 | Schneider |
| 2,945,111 A | 10/1958 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bioelow |
| 4,242,676 A | 12/1980 | Piguet et al. |
| 4,246,452 A | 1/1981 | Chandler |
| 4,264,903 A | 4/1981 | Bioelow |
| 4,266,144 A | 5/1981 | Bristol |
| 4,293,734 A | 10/1981 | Peper, Jr. |
| D264,969 S | 6/1982 | McGoutrv |
| 4,338,502 A | 7/1982 | Hashimoto et al. |
| 4,346,376 A | 8/1982 | Mallos |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,658,690 A | 4/1987 | Aitken et al. |
| 4,719,524 A | 1/1988 | Morishima et al. |
| 4,731,058 A | 3/1988 | Doan |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,797,514 A | 1/1989 | Talmage, Jr. et al. |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,053,758 A | 10/1991 | Cornett et al. |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Naqai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,426,450 A | 6/1995 | Drumm |
| 5,432,531 A | 7/1995 | Calder et al. |
| 5,434,757 A | 7/1995 | Kashiwagi |
| 5,438,331 A | 8/1995 | Gillioan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,481,278 A | 1/1996 | Shigematsu et al. |
| 5,483,261 A | 1/1996 | Yasutake |
| 5,488,204 A | 1/1996 | Mead et al. |
| 5,494,157 A | 2/1996 | Golenz et al. |
| 5,495,077 A | 2/1996 | Miller et al. |
| 5,495,566 A | 2/1996 | Kwatinetz |
| 5,508,703 A | 4/1996 | Okamura et al. |
| 5,508,717 A | 4/1996 | Miller |
| 5,541,372 A | 7/1996 | Baller et al. |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,563,632 A | 10/1996 | Roberts |
| 5,564,112 A | 10/1996 | Hayes et al. |
| 5,565,887 A | 10/1996 | Mccambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,591,945 A | 1/1997 | Kent |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tart |
| 5,661,632 A | 8/1997 | Reqister |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philioo |
| 5,748,185 A | 5/1998 | Stephan et al. |
| 5,748,512 A | 5/1998 | Vargas |
| 5,751,274 A | 5/1998 | Davis |
| 5,754,890 A | 5/1998 | Holmdahl et al. |
| 5,764,066 A | 6/1998 | Novak et al. |
| 5,764,218 A | 6/1998 | Della Bona et al. |

(56) References Cited

U.S. PATENT DOCUMENTS

| | | |
|---|---|---|
| 5,767,457 A | 6/1998 | Gerpheide et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,801,941 A | 9/1998 | Bertram et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,821,922 A | 10/1998 | Sellers |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,835,079 A | 11/1998 | Shieh |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,864,334 A | 1/1999 | Sellers |
| 5,869,791 A | 2/1999 | Young |
| 5,875,311 A | 2/1999 | Bertram et al. |
| 5,880,411 A | 3/1999 | Gillespie et al. |
| 5,883,612 A | 3/1999 | Kreitzer |
| 5,883,619 A | 3/1999 | Ho et al. |
| 5,889,236 A | 3/1999 | Gillespie et al. |
| 5,889,511 A | 3/1999 | Ong et al. |
| 5,890,181 A | 3/1999 | Selesky et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,943,052 A | 8/1999 | Allen et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,963,671 A | 10/1999 | Comerford et al. |
| 5,964,661 A | 10/1999 | Dodge |
| 5,973,668 A | 10/1999 | Watanabe |
| 5,996,080 A | 11/1999 | Silva et al. |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,011,542 A | 1/2000 | Durrani et al. |
| 6,025,832 A | 2/2000 | Sudo et al. |
| 6,031,518 A | 2/2000 | Adams et al. |
| 6,034,672 A | 3/2000 | Gaultiet et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,118,435 A | 9/2000 | Fujita et al. |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,154,210 A | 11/2000 | Anderson |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,185,591 B1 | 2/2001 | Baker et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,216,988 B1 | 4/2001 | Hsu et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Moine |
| 6,243,646 B1 | 6/2001 | Ozaki et al. |
| 6,246,395 B1 | 6/2001 | Goyins et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| 6,310,610 B1 | 10/2001 | Beaton et al. |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| 6,323,846 B1 | 11/2001 | Westerman et al. |
| D452,250 S | 12/2001 | Chan |
| 6,336,614 B1 | 1/2002 | Kwitek |
| 6,337,678 B1 | 1/2002 | Fish |
| 6,340,800 B1 | 1/2002 | Zhai et al. |
| D454,568 S | 3/2002 | Andre et al. |
| 6,357,887 B1 | 3/2002 | Novak |
| 6,359,572 B1 | 3/2002 | Vale |
| D455,793 S | 4/2002 | Lin |
| 6,369,803 B2 | 4/2002 | Brisebois et al. |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,407,325 B2 | 6/2002 | Yi et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,459,424 B1 | 10/2002 | Resman |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| 6,504,530 B1 | 1/2003 | Wilson et al. |
| D472,245 S | 3/2003 | Andre et al. |
| 6,546,231 B1 | 4/2003 | Someya et al. |
| 6,563,487 B2 | 5/2003 | Martin et al. |

(56) References Cited

U.S. PATENT DOCUMENTS

| | | |
|---|---|---|
| 6,570,557 B1 | 5/2003 | Westerman et al. |
| 6,573,844 B1 | 6/2003 | Venolia et al. |
| 6,587,091 B2 | 7/2003 | Serpa |
| 6,597,345 B2 | 7/2003 | Hirshberg |
| 6,606,244 B1 | 8/2003 | Liu et al. |
| 6,610,936 B2 | 8/2003 | Gillespie et al. |
| 6,611,253 B1 | 8/2003 | Cohen |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| 6,654,001 B1 | 11/2003 | Su |
| 6,654,733 B1 | 11/2003 | Goodman et al. |
| D483,809 S | 12/2003 | Lim |
| 6,658,773 B2 | 12/2003 | Rohne et al. |
| 6,664,951 B1 | 12/2003 | Fuiii et al. |
| 6,677,927 B1 | 1/2004 | Bruck et al. |
| 6,677,932 B1 | 1/2004 | Westerman |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,690,387 B2 | 2/2004 | Zimmerman et al. |
| 6,703,550 B2 | 3/2004 | Chu |
| 6,710,771 B1 | 3/2004 | Yamaguchi et al. |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,747,636 B2 | 6/2004 | Martin |
| 6,750,803 B2 | 6/2004 | Yates et al. |
| 6,756,971 B1 | 6/2004 | Ramey et al. |
| 6,760,012 B1 | 7/2004 | Laurila |
| 6,765,557 B1 | 7/2004 | Segal et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,819,312 B2 | 11/2004 | Fish |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Montalcini |
| 6,867,965 B2 | 3/2005 | Khoo |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,943,705 B1 | 9/2005 | Bolender et al. |
| 6,943,779 B2 | 9/2005 | Satoh |
| 6,958,614 B2 | 10/2005 | Morimoto |
| 6,958,749 B1 | 10/2005 | Matsushita et al. |
| 6,977,808 B2 | 12/2005 | Lam et al. |
| 6,978,127 B1 | 12/2005 | Bulthuis et al. |
| 6,982,695 B1 | 1/2006 | Canova et al. |
| 6,985,137 B2 | 1/2006 | Kaikuranta |
| 7,006,077 B1 | 2/2006 | Uusimäki |
| 7,015,894 B2 | 3/2006 | Morohoshi |
| 7,019,225 B2 | 3/2006 | Matsumoto et al. |
| 7,038,659 B2 | 5/2006 | Rajkowski |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huooi |
| 7,088,347 B2 | 8/2006 | Iisaka et al. |
| 7,107,147 B2 | 9/2006 | Pascual et al. |
| 7,111,788 B2 | 9/2006 | Reponen |
| 7,113,196 B2 | 9/2006 | Kerr |
| 7,113,520 B1 | 9/2006 | Meenan |
| 7,117,136 B1 | 10/2006 | Rosedale |
| 7,119,792 B1 | 10/2006 | Andre et al. |
| 7,148,882 B2 | 12/2006 | Kamrath et al. |
| 7,149,550 B2 | 12/2006 | Kraft et al. |
| 7,176,902 B2 | 2/2007 | Peterson et al. |
| 7,184,064 B2 | 2/2007 | Zimmerman et al. |
| 7,215,319 B2 | 5/2007 | Kamijo et al. |
| 7,218,956 B2 | 5/2007 | Okawa |
| 7,233,318 B1 | 6/2007 | Farao et al. |
| 7,236,154 B1 | 6/2007 | Kerr et al. |
| 7,236,159 B1 | 6/2007 | Siversson |
| 7,253,643 B1 | 8/2007 | Seguine |
| 7,277,087 B2 | 10/2007 | Hill et al. |
| 7,279,647 B2 | 10/2007 | Philipp |
| 7,286,115 B2 | 10/2007 | Longe et al. |
| 7,288,732 B2 | 10/2007 | Hashida |
| 7,289,111 B2 | 10/2007 | Asbill |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,345,670 B2 | 3/2008 | Armstrong |
| 7,345,671 B2 | 3/2008 | Robbin et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,499,040 B2 | 3/2009 | Zadesky et al. |
| 7,502,016 B2 | 3/2009 | Trent, Jr. et al. |
| 7,503,193 B2 | 3/2009 | Schoene et al. |
| 7,561,146 B1 | 7/2009 | Hotelling |
| 7,593,782 B2 | 9/2009 | Jobs et al. |
| 7,609,178 B2 | 10/2009 | Son et al. |
| 7,616,097 B1 | 11/2009 | Whang |
| 7,633,076 B2 | 12/2009 | Huppi et al. |
| 7,639,233 B2 | 12/2009 | Marks |
| 7,645,955 B2 | 1/2010 | Huang et al. |
| 7,663,607 B2 | 2/2010 | Hotelling et al. |
| 7,671,837 B2 | 3/2010 | Forsblad et al. |
| 7,708,051 B2 | 5/2010 | Katsumi et al. |
| 7,746,325 B2 | 6/2010 | Roberts |
| 7,772,507 B2 | 8/2010 | Orr et al. |
| 7,834,855 B2 | 11/2010 | Hotelling et al. |
| 7,852,199 B2 | 12/2010 | Desai et al. |
| 7,911,455 B2 | 3/2011 | Nishikawa et al. |
| 7,986,307 B2 | 7/2011 | Zotov et al. |
| 8,044,314 B2 | 10/2011 | Weber et al. |
| 8,072,439 B2 | 12/2011 | Hillis et al. |
| 8,098,233 B2 | 1/2012 | Hotelling et al. |
| 8,174,508 B2 | 5/2012 | Sinclair et al. |
| 8,253,698 B2 | 8/2012 | Chen et al. |
| 8,294,047 B2 | 10/2012 | Westerman et al. |
| 8,445,793 B2 | 5/2013 | Westerman et al. |
| 8,479,122 B2 | 7/2013 | Hotelling et al. |
| 8,645,827 B2 | 2/2014 | Beaver et al. |
| 8,970,533 B2 | 3/2015 | Westerman et al. |
| 9,041,663 B2 | 5/2015 | Westerman et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0035854 A1 | 11/2001 | Rosenberg et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0015024 A1 | 2/2002 | Westerman et al. |
| 2002/0027547 A1 | 3/2002 | Kamijo et al. |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |

(56) References Cited

U.S. PATENT DOCUMENTS

| | | |
|---|---|---|
| 2002/0072394 A1 | 6/2002 | Muramatsu |
| 2002/0080123 A1 | 6/2002 | Kennedy et al. |
| 2002/0089545 A1 | 7/2002 | Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158838 A1 | 10/2002 | Smith et al. |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0038776 A1* | 2/2003 | Rosenberg et al. ........... 345/156 |
| 2003/0043121 A1 | 3/2003 | Chen |
| 2003/0043174 A1 | 3/2003 | Hinckley et al. |
| 2003/0048262 A1 | 3/2003 | Wu et al. |
| 2003/0050092 A1 | 3/2003 | Yun |
| 2003/0070106 A1 | 4/2003 | Kosuda et al. |
| 2003/0076301 A1 | 4/2003 | Tsuk et al. |
| 2003/0076303 A1 | 4/2003 | Huppi |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0104839 A1 | 6/2003 | Kraft et al. |
| 2003/0122787 A1 | 7/2003 | Zimmerman et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0162569 A1 | 8/2003 | Arakawa et al. |
| 2003/0184517 A1 | 10/2003 | Senzui et al. |
| 2003/0197740 A1 | 10/2003 | Reponen |
| 2003/0206162 A1 | 11/2003 | Roberts |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0009788 A1 | 1/2004 | Mantyjarvi et al. |
| 2004/0012572 A1 | 1/2004 | Sowden et al. |
| 2004/0027341 A1 | 2/2004 | Derocher |
| 2004/0055446 A1 | 3/2004 | Robbin et al. |
| 2004/0070567 A1 | 4/2004 | Longe et al. |
| 2004/0074756 A1 | 4/2004 | Kawakami et al. |
| 2004/0080682 A1 | 4/2004 | Dalton |
| 2004/0104894 A1 | 6/2004 | Tsukada et al. |
| 2004/0108994 A1 | 6/2004 | Kato |
| 2004/0109357 A1 | 6/2004 | Cernea et al. |
| 2004/0119744 A1 | 6/2004 | Chan |
| 2004/0150619 A1 | 8/2004 | Baudisch et al. |
| 2004/0156192 A1 | 8/2004 | Kerr et al. |
| 2004/0165924 A1 | 8/2004 | Griffin |
| 2004/0178997 A1 | 9/2004 | Gillespie et al. |
| 2004/0185912 A1 | 9/2004 | Mason et al. |
| 2004/0200699 A1 | 10/2004 | Matsumoto et al. |
| 2004/0207605 A1 | 10/2004 | Mackey et al. |
| 2004/0215986 A1 | 10/2004 | Shakkarwar |
| 2004/0218963 A1 | 11/2004 | Van Diepen et al. |
| 2004/0224638 A1 | 11/2004 | Fadell et al. |
| 2004/0227736 A1 | 11/2004 | Kamrath et al. |
| 2004/0233624 A1 | 11/2004 | Aisenberg |
| 2004/0239622 A1 | 12/2004 | Proctor et al. |
| 2004/0252109 A1 | 12/2004 | Trent et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0052425 A1 | 3/2005 | Zadeski et al. |
| 2005/0052426 A1 | 3/2005 | Hagermoser et al. |
| 2005/0052427 A1* | 3/2005 | Wu et al. ........................ 345/173 |
| 2005/0052429 A1 | 3/2005 | Philipp |
| 2005/0068304 A1 | 3/2005 | Lewis et al. |
| 2005/0078093 A1 | 4/2005 | Peterson et al. |
| 2005/0081164 A1 | 4/2005 | Hama et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0125570 A1 | 6/2005 | Olodort et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0146512 A1 | 7/2005 | Hill et al. |
| 2005/0156881 A1 | 7/2005 | Trent et al. |
| 2005/0162402 A1 | 7/2005 | Watanachote |
| 2005/0195159 A1 | 9/2005 | Hunleth et al. |
| 2005/0204309 A1 | 9/2005 | Szeto |
| 2005/0237308 A1 | 10/2005 | Autio et al. |
| 2005/0253818 A1 | 11/2005 | Nettamo |
| 2005/0283724 A1 | 12/2005 | Griffin |
| 2006/0007131 A1* | 1/2006 | Lane et al. ..................... 345/156 |
| 2006/0022956 A1 | 2/2006 | Lengeling et al. |
| 2006/0026521 A1 | 2/2006 | Hotelling et al. |
| 2006/0032680 A1 | 2/2006 | Elias et al. |
| 2006/0033701 A1 | 2/2006 | Wilson |
| 2006/0038791 A1 | 2/2006 | Mackey |
| 2006/0038796 A1 | 2/2006 | Hinckley et al. |
| 2006/0052885 A1 | 3/2006 | Kong |
| 2006/0066588 A1 | 3/2006 | Lyon et al. |
| 2006/0095848 A1 | 5/2006 | Naik |
| 2006/0097991 A1 | 5/2006 | Hotelling et al. |
| 2006/0097997 A1 | 5/2006 | Borgaonkar et al. |
| 2006/0109252 A1 | 5/2006 | Kolmykov-Zotov et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0197753 A1 | 9/2006 | Hotelling |
| 2006/0228149 A1 | 10/2006 | Harley |
| 2006/0232557 A1 | 10/2006 | Fallot-Burghardt |
| 2006/0236262 A1 | 10/2006 | Bathiche et al. |
| 2006/0238522 A1 | 10/2006 | Westerman et al. |
| 2006/0250377 A1 | 11/2006 | Zadesky et al. |
| 2006/0256090 A1 | 11/2006 | Huppi |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0046641 A1 | 3/2007 | Lim |
| 2007/0052044 A1 | 3/2007 | Forsblad et al. |
| 2007/0052691 A1 | 3/2007 | Zadesky et al. |
| 2007/0075965 A1 | 4/2007 | Huppi et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0106732 A1 | 5/2007 | Weis |
| 2007/0120834 A1 | 5/2007 | Boillot |
| 2007/0126696 A1 | 6/2007 | Boillot |
| 2007/0152975 A1 | 7/2007 | Ogihara |
| 2007/0152976 A1 | 7/2007 | Townsend et al. |
| 2007/0152977 A1 | 7/2007 | No et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0182722 A1 | 8/2007 | Hotelling et al. |
| 2007/0242057 A1 | 10/2007 | Zadesky et al. |
| 2007/0247421 A1 | 10/2007 | Orsley et al. |
| 2007/0247429 A1 | 10/2007 | Westerman |

(56) References Cited

U.S. PATENT DOCUMENTS

| | | |
|---|---|---|
| 2007/0247443 A1 | 10/2007 | Philipp |
| 2007/0262968 A1 | 11/2007 | Kazuhito et al. |
| 2007/0268275 A1 | 11/2007 | Westerman et al. |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lamoell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | Guanghai |
| 2008/0006453 A1 | 1/2008 | Hotelling et al. |
| 2008/0006454 A1 | 1/2008 | Hotelling et al. |
| 2008/0007533 A1 | 1/2008 | Hotelling et al. |
| 2008/0007539 A1 | 1/2008 | Hotelling et al. |
| 2008/0012835 A1 | 1/2008 | Rimon et al. |
| 2008/0012837 A1 | 1/2008 | Marriott et al. |
| 2008/0012838 A1 | 1/2008 | Rimon |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0062144 A1 | 3/2008 | Shahoian et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0136788 A1 | 6/2008 | Nishikawa et al. |
| 2008/0136792 A1 | 6/2008 | Peng et al. |
| 2008/0143681 A1 | 6/2008 | XiaoPing |
| 2008/0158145 A1 | 7/2008 | Westerman |
| 2008/0158172 A1 | 7/2008 | Hotelling et al. |
| 2008/0158181 A1 | 7/2008 | Hamblin et al. |
| 2008/0158185 A1 | 7/2008 | Westerman |
| 2008/0165158 A1 | 7/2008 | Hotelling et al. |
| 2008/0192026 A1 | 8/2008 | Mackey et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0015564 A1 | 1/2009 | Ye et al. |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0101417 A1 | 4/2009 | Suzuki et al. |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0174679 A1 | 7/2009 | Westerman |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0244092 A1 | 10/2009 | Hotelling |
| 2009/0273573 A1 | 11/2009 | Hotelling |
| 2009/0284495 A1 | 11/2009 | Geaghan et al. |
| 2009/0322351 A1 | 12/2009 | McLeod |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0099394 A1 | 4/2010 | Hainzl |
| 2010/0139990 A1 | 6/2010 | Westerman et al. |
| 2010/0141603 A1 | 6/2010 | Hotelling |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |
| 2011/0163996 A1 | 7/2011 | Wassvik et al. |
| 2012/0019468 A1 | 1/2012 | Westerman et al. |
| 2012/0023459 A1 | 1/2012 | Westerman et al. |
| 2012/0113009 A1 | 5/2012 | Hotelling |
| 2014/0192001 A1 | 7/2014 | McKillop |
| 2015/0049059 A1 | 2/2015 | Zadesky et al. |
| 2015/0062050 A1 | 3/2015 | Zadesky et al. |
| 2015/0153865 A1 | 6/2015 | Westerman et al. |
| 2015/0253891 A1 | 9/2015 | Westerman |

FOREIGN PATENT DOCUMENTS

| | | |
|---|---|---|
| CN | 1455615 A | 11/2003 |
| CN | 1499356 A | 5/2004 |
| CN | 1659506 | 8/2005 |
| DE | 3615742 | 11/1987 |
| DE | 19722636 A1 | 12/1998 |
| DE | 10022537 A1 | 11/2000 |
| DE | 20019074 | 2/2001 |
| DE | 103 04 704 | 8/2004 |
| DE | 10 2004 043 663 | 4/2006 |
| EP | 0 178 157 | 4/1986 |
| EP | 0178157 | 4/1986 |
| EP | 0 419 145 A1 | 3/1991 |
| EP | 0419145 | 3/1991 |
| EP | 0 498 540 A2 | 8/1992 |
| EP | 0498540 | 8/1992 |
| EP | 0 521 683 A1 | 1/1993 |
| EP | 0 521 683 A2 | 1/1993 |
| EP | 0521683 | 1/1993 |
| EP | 1521683 | 1/1993 |
| EP | 0 588 210 | 3/1994 |
| EP | 0 674 288 A1 | 9/1995 |
| EP | 0 731 407 A1 | 9/1996 |
| EP | 0 551 778 B1 | 1/1997 |
| EP | 0551778 | 1/1997 |
| EP | 0 880 091 A2 | 11/1998 |
| EP | 0880091 | 11/1998 |
| EP | 1 018 680 | 7/2000 |
| EP | 1 026 713 | 8/2000 |
| EP | 1 026 713 A1 | 8/2000 |
| EP | 1 081 922 A2 | 3/2001 |
| EP | 1081922 A2 | 3/2001 |
| EP | 1 098 241 A2 | 5/2001 |
| EP | 1098241 A2 | 5/2001 |
| EP | 1 133 057 | 9/2001 |
| EP | 1 133 057 A2 | 9/2001 |
| EP | 1 133 057 A3 | 9/2001 |
| EP | 1 133 057 B1 | 9/2001 |
| EP | 1 162 826 A2 | 12/2001 |
| EP | 1162826 A2 | 12/2001 |
| EP | 1 168 396 | 1/2002 |
| EP | 1 184 804 | 3/2002 |
| EP | 1 205 836 A2 | 5/2002 |
| EP | 1205836 A2 | 5/2002 |
| EP | 1 244 053 | 9/2002 |
| EP | 1 251 455 A2 | 10/2002 |
| EP | 1251455 A2 | 10/2002 |
| EP | 1 263 193 | 12/2002 |
| EP | 1263193 | 12/2002 |
| EP | 1 347 481 | 9/2003 |
| EP | 1 376 326 | 1/2004 |
| EP | 1 482 401 | 1/2004 |
| EP | 1376326 | 1/2004 |
| EP | 1 467 392 | 10/2004 |
| EP | 1 467 392 A2 | 10/2004 |
| EP | 1 482 401 A2 | 12/2004 |
| EP | 1 496 467 | 1/2005 |
| EP | 1 496 467 A2 | 1/2005 |
| EP | 1 496 467 A3 | 1/2005 |

(56) References Cited

FOREIGN PATENT DOCUMENTS

| | | |
|---|---|---|
| EP | 1 510 911 | 3/2005 |
| EP | 1 513 049 | 3/2005 |
| EP | 1 517 228 | 3/2005 |
| EP | 1 517 228 A | 3/2005 |
| EP | 1 542 437 A2 | 6/2005 |
| EP | 1542437 | 6/2005 |
| EP | 1 589 407 | 10/2005 |
| EP | 1 589 407 A1 | 10/2005 |
| EP | 1 691 263 | 8/2006 |
| EP | 1 784 058 A2 | 5/2007 |
| EP | 1 841 188 | 10/2007 |
| EP | 1 850 218 | 10/2007 |
| EP | 1850218 | 10/2007 |
| EP | 1 876 711 | 1/2008 |
| FR | 2 686 440 A1 | 7/1993 |
| FR | 2 686 440 A1 | 7/1993 |
| GB | 2015167 | 9/1979 |
| GB | 2072389 | 9/1981 |
| GB | 2315186 | 1/1998 |
| GB | 2333215 | 7/1999 |
| GB | 2 344 894 | 6/2000 |
| GB | 2391060 | 1/2004 |
| GB | 2 402 105 | 12/2004 |
| GB | 2 402 105 A | 12/2004 |
| GB | 2402105 | 12/2004 |
| JP | 57-95722 | 6/1982 |
| JP | 57-97626 | 6/1982 |
| JP | 57-097626 A | 6/1982 |
| JP | 61-075981 | 4/1986 |
| JP | 61-117619 | 6/1986 |
| JP | 61-117619 A | 6/1986 |
| JP | 61-124009 | 6/1986 |
| JP | 61-124009 A | 6/1986 |
| JP | 62-020411 A | 1/1988 |
| JP | 63-20411 | 1/1988 |
| JP | 63-106826 | 5/1988 |
| JP | 63-106826 A | 5/1988 |
| JP | 63-181022 | 7/1988 |
| JP | 63-181022 A | 7/1988 |
| JP | 63-298518 | 12/1988 |
| JP | 63-298518 A | 12/1988 |
| JP | 03-57617 | 6/1991 |
| JP | 3-192418 | 8/1991 |
| JP | 04-32920 | 2/1992 |
| JP | 4-32920 | 2/1992 |
| JP | 4-205408 | 7/1992 |
| JP | 5-041135 | 2/1993 |
| JP | 5-041135 A | 2/1993 |
| JP | 5-080938 | 4/1993 |
| JP | 5-080938 A | 4/1993 |
| JP | 5-101741 | 4/1993 |
| JP | 5-101741 A | 4/1993 |
| JP | 5-36623 | 5/1993 |
| JP | 05-36623 | 5/1993 |
| JP | 5-189110 | 7/1993 |
| JP | 5-189110 A | 7/1993 |
| JP | 5-205565 | 8/1993 |
| JP | 5-205565 A | 8/1993 |
| JP | 5-211021 | 8/1993 |
| JP | 5-211021 A | 8/1993 |
| JP | 5-217464 | 8/1993 |
| JP | 5-217464 A | 8/1993 |
| JP | 05-233141 | 9/1993 |
| JP | 5-233141 A | 9/1993 |
| JP | 05-257594 | 10/1993 |
| JP | 05-262276 | 10/1993 |
| JP | 5-262276 A | 10/1993 |
| JP | 5-265656 | 10/1993 |
| JP | 5-265656 A | 10/1993 |
| JP | 5-274956 | 10/1993 |
| JP | 5-274956 A | 10/1993 |
| JP | 05-289811 | 11/1993 |
| JP | 5-289811 A | 11/1993 |
| JP | 5-298955 | 11/1993 |
| JP | 5-298955 A | 11/1993 |
| JP | 5-325723 | 12/1993 |
| JP | 5-325723 A | 12/1993 |
| JP | 6-20570 | 1/1994 |
| JP | 06-20570 | 1/1994 |
| JP | 6-084428 | 3/1994 |
| JP | 6-084428 A | 3/1994 |
| JP | 6-089636 | 3/1994 |
| JP | 6-089636 A | 3/1994 |
| JP | 6-96639 | 4/1994 |
| JP | 06-111685 | 4/1994 |
| JP | 06-111695 | 4/1994 |
| JP | 6-111695 | 4/1994 |
| JP | 6-111695 A | 4/1994 |
| JP | 6-139879 | 5/1994 |
| JP | 6-139879 A | 5/1994 |
| JP | 06-149466 | 5/1994 |
| JP | 06-187078 | 7/1994 |
| JP | 6-187078 A | 7/1994 |
| JP | 06-208433 | 7/1994 |
| JP | 6-208433 A | 7/1994 |
| JP | 6-267382 | 9/1994 |
| JP | 6-267382 A | 9/1994 |
| JP | 06-283993 | 10/1994 |
| JP | 6-283993 A | 10/1994 |
| JP | 06-289969 | 10/1994 |
| JP | 6-333459 | 12/1994 |
| JP | 6-333459 A | 12/1994 |
| JP | 07-073278 | 3/1995 |
| JP | 7-107574 | 4/1995 |
| JP | 7-107574 A | 4/1995 |
| JP | 7-41882 | 7/1995 |
| JP | 7-201249 | 8/1995 |
| JP | 7-201249 A | 8/1995 |
| JP | 07-201256 | 8/1995 |
| JP | 7-201256 A | 8/1995 |
| JP | 07-253838 | 10/1995 |
| JP | 7-253838 A | 10/1995 |
| JP | 7-261899 | 10/1995 |
| JP | 7-261899 A | 10/1995 |
| JP | 7-261922 | 10/1995 |
| JP | 7-261922 A | 10/1995 |
| JP | 07-296670 | 11/1995 |
| JP | 7-296670 A | 11/1995 |
| JP | 7-319001 | 12/1995 |
| JP | 07-319001 A | 12/1995 |
| JP | 08-016292 | 1/1996 |
| JP | 8-016292 A | 1/1996 |
| JP | 8-115158 | 5/1996 |
| JP | 8-115158 A | 5/1996 |
| JP | 8-203387 | 8/1996 |
| JP | 8-203387 A | 8/1996 |
| JP | 8-293226 | 11/1996 |
| JP | 8-293226 A | 11/1996 |
| JP | 8-298045 | 11/1996 |
| JP | 8-298045 A | 11/1996 |
| JP | 08-299541 | 11/1996 |
| JP | 8-299541 A | 11/1996 |
| JP | 8-316664 | 11/1996 |
| JP | 8-316664 A | 11/1996 |
| JP | 09-044289 | 2/1997 |
| JP | 9-044289 A | 2/1997 |
| JP | 09-044293 | 2/1997 |
| JP | 09-069023 | 3/1997 |
| JP | 9-069023 A | 3/1997 |
| JP | 09-128148 | 5/1997 |
| JP | 9-128148 A | 5/1997 |
| JP | 9-134248 | 5/1997 |
| JP | 9-134248 A | 5/1997 |
| JP | 9-218747 | 8/1997 |
| JP | 9-218747 A | 8/1997 |
| JP | 9-230993 | 9/1997 |
| JP | 9-230993 A | 9/1997 |
| JP | 9-231858 | 9/1997 |
| JP | 9-231858 A | 9/1997 |
| JP | 09-233161 | 9/1997 |
| JP | 9-233161 A | 9/1997 |
| JP | 9-251347 | 9/1997 |
| JP | 9-251347 A | 9/1997 |
| JP | 9-258895 | 10/1997 |

(56) References Cited

FOREIGN PATENT DOCUMENTS

| | | |
|---|---|---|
| JP | 9-258895 A | 10/1997 |
| JP | 9-288926 | 11/1997 |
| JP | 9-288926 A | 11/1997 |
| JP | 9-512979 | 12/1997 |
| JP | 9-512979 A | 12/1997 |
| JP | 10-003349 | 1/1998 |
| JP | 10-63467 | 3/1998 |
| JP | 10-63467 A | 3/1998 |
| JP | 10-74127 | 3/1998 |
| JP | 10-74127 A | 3/1998 |
| JP | 10-074429 | 3/1998 |
| JP | 10-074429 A | 3/1998 |
| JP | 10-198507 | 7/1998 |
| JP | 10-198507 A | 7/1998 |
| JP | 10-227878 | 8/1998 |
| JP | 10-227878 A | 8/1998 |
| JP | 10-240693 A | 9/1998 |
| JP | 10-289061 | 10/1998 |
| JP | 10-293644 | 11/1998 |
| JP | 10-320322 | 12/1998 |
| JP | 10-320322 A | 12/1998 |
| JP | 10-326149 | 12/1998 |
| JP | 10-326149 A | 12/1998 |
| JP | 11-24834 | 1/1999 |
| JP | 11-184607 | 7/1999 |
| JP | 11-184607 A | 7/1999 |
| JP | 11-194863 | 7/1999 |
| JP | 11-194863 A | 7/1999 |
| JP | 11-194872 | 7/1999 |
| JP | 11-194872 A | 7/1999 |
| JP | 11-194882 | 7/1999 |
| JP | 11-194882 A | 7/1999 |
| JP | 11-194883 | 7/1999 |
| JP | 11-194883 A | 7/1999 |
| JP | 11-194891 | 7/1999 |
| JP | 11-194891 A | 7/1999 |
| JP | 11-195353 | 7/1999 |
| JP | 11-195353 A | 7/1999 |
| JP | 11-203045 | 7/1999 |
| JP | 11-203045 A | 7/1999 |
| JP | 11-212725 | 8/1999 |
| JP | 11-212725 A | 8/1999 |
| JP | 11-272378 | 10/1999 |
| JP | 11-272378 A | 10/1999 |
| JP | 11-327788 | 11/1999 |
| JP | 11-338628 | 12/1999 |
| JP | 11-338628 A | 12/1999 |
| JP | 2000-039964 | 2/2000 |
| JP | 2000-163031 A | 6/2000 |
| JP | 2000-163211 | 6/2000 |
| JP | 2000-172441 | 6/2000 |
| JP | 2000-194507 | 7/2000 |
| JP | 2000-200147 | 7/2000 |
| JP | 2000-200147 A | 7/2000 |
| JP | 2000-215549 | 8/2000 |
| JP | 2000-215549 A | 8/2000 |
| JP | 2000-267777 | 9/2000 |
| JP | 2000-267786 | 9/2000 |
| JP | 2000-267786 A | 9/2000 |
| JP | 2000-267797 | 9/2000 |
| JP | 2000-267797 A | 9/2000 |
| JP | 2000-353045 | 12/2000 |
| JP | 2000-353045 A | 12/2000 |
| JP | 2001-11769 | 1/2001 |
| JP | 2001-011769 A | 1/2001 |
| JP | 2001-22508 | 1/2001 |
| JP | 2001-022508 A | 1/2001 |
| JP | 2001-184158 | 7/2001 |
| JP | 2001-184158 A | 7/2001 |
| JP | 2002-56747 | 2/2002 |
| JP | 3085481 | 2/2002 |
| JP | 3085481 U | 5/2002 |
| JP | 2002-210863 A | 7/2002 |
| JP | 2002-215311 | 8/2002 |
| JP | 2002-215311 A | 8/2002 |
| JP | 2002-287889 | 10/2002 |
| JP | 2002-287903 | 10/2002 |
| JP | 2002-342033 A | 11/2002 |
| JP | 2003-015796 | 1/2003 |
| JP | 2003-015796 A | 1/2003 |
| JP | 2003-060754 | 2/2003 |
| JP | 2003-060754 A | 2/2003 |
| JP | 2003-099198 | 4/2003 |
| JP | 2003-099198 A | 4/2003 |
| JP | 2003-150303 | 5/2003 |
| JP | 2003-150303 A | 5/2003 |
| JP | 2003-517674 | 5/2003 |
| JP | 2003-517674 A | 5/2003 |
| JP | 2003-173237 | 6/2003 |
| JP | 2003-280799 | 10/2003 |
| JP | 2003-280799 A | 10/2003 |
| JP | 2003-280807 | 10/2003 |
| JP | 2003-280807 A | 10/2003 |
| JP | 2003-530772 | 10/2003 |
| JP | 2004-170941 | 6/2004 |
| JP | 2004-362097 | 12/2004 |
| JP | 2004-362097 A | 12/2004 |
| JP | 2005-082086 | 3/2005 |
| JP | 2005-251218 | 9/2005 |
| JP | 2005-251218 A | 9/2005 |
| JP | 2005-285140 | 10/2005 |
| JP | 2005-285140 A | 10/2005 |
| JP | 2005-293606 | 10/2005 |
| JP | 2005-293606 A | 10/2005 |
| JP | 2006-004453 | 1/2006 |
| JP | 2006-004453 A | 1/2006 |
| JP | 2006-512626 | 4/2006 |
| JP | 2006-178962 | 7/2006 |
| JP | 2006-178962 A | 7/2006 |
| JP | 3852854 | 12/2006 |
| JP | 2007-123473 | 5/2007 |
| JP | 2007-123473 A | 5/2007 |
| JP | 2007-242035 | 9/2007 |
| JP | 2007-304757 | 11/2007 |
| JP | 2008-140182 | 6/2008 |
| JP | 2008-234212 | 10/2008 |
| KR | 1998-71394 | 10/1998 |
| KR | 1999-50198 | 7/1999 |
| KR | 2000-0008579 | 2/2000 |
| KR | 2000-08579 | 2/2000 |
| KR | 2001-0052016 | 6/2001 |
| KR | 2001-108361 | 12/2001 |
| KR | 2002-65059 | 8/2002 |
| KR | 102002-00650 | 8/2002 |
| KR | 2004-0103125 | 12/2004 |
| KR | 10-2005-0006068 | 1/2005 |
| KR | 10-2006-0021678 | 3/2006 |
| KR | 10-2006-0021678 A | 3/2006 |
| TW | 431607 | 4/2001 |
| TW | 00470193 | 12/2001 |
| TW | 547716 | 8/2003 |
| TW | 220491 | 8/2004 |
| TW | 1220491 | 8/2004 |
| WO | WO-92/11623 | 7/1992 |
| WO | WO-94/17494 | 8/1994 |
| WO | WO-94/17494 A2 | 8/1994 |
| WO | WO-95/00897 | 1/1995 |
| WO | WO-95/00897 A1 | 1/1995 |
| WO | WO-96/27968 | 9/1996 |
| WO | WO-98/14863 | 4/1998 |
| WO | WO-98/29886 | 7/1998 |
| WO | WO-98/43202 | 10/1998 |
| WO | WO-99/49443 | 9/1999 |
| WO | WO-00/79772 | 12/2000 |
| WO | WO-00/79772 A1 | 12/2000 |
| WO | WO-01/02949 | 1/2001 |
| WO | WO-01/44912 | 6/2001 |
| WO | WO-01/74133 | 10/2001 |
| WO | WO-02/08881 | 1/2002 |
| WO | WO-02/080210 | 10/2002 |
| WO | WO-03/025960 | 3/2003 |
| WO | WO-03/025960 A1 | 3/2003 |
| WO | WO-03/044645 | 5/2003 |
| WO | WO-03/044645-A1 | 5/2003 |

(56) References Cited

FOREIGN PATENT DOCUMENTS

| | | |
|---|---|---|
| WO | WO-03/044956 | 5/2003 |
| WO | WO-03/025960 | 9/2003 |
| WO | WO-03/088176 | 10/2003 |
| WO | WO-03/090008 | 10/2003 |
| WO | WO-03/090008 A2 | 10/2003 |
| WO | WO-03/090008 A3 | 10/2003 |
| WO | WO-2004/001573 | 12/2003 |
| WO | WO-2004/025449 | 3/2004 |
| WO | WO-2004/040606 | 5/2004 |
| WO | WO-2004/040606 A2 | 5/2004 |
| WO | WO-2004/040606 A3 | 5/2004 |
| WO | WO-2004/091956 | 10/2004 |
| WO | WO-2004/091956 A2 | 10/2004 |
| WO | WO-2004/091956 A3 | 10/2004 |
| WO | WO-2005/006442 | 1/2005 |
| WO | WO-2005/055620 | 6/2005 |
| WO | WO-2005/055620 A2 | 6/2005 |
| WO | WO-2005/076117 | 8/2005 |
| WO | WO-2005/076117 A1 | 8/2005 |
| WO | WO-2005/114369 | 12/2005 |
| WO | WO-2005/114369 A2 | 12/2005 |
| WO | WO-2005/114369 A3 | 12/2005 |
| WO | WO-2005/124526 | 12/2005 |
| WO | WO-2005/124526 A2 | 12/2005 |
| WO | WO-2005/124526 A3 | 12/2005 |
| WO | WO-2006/020305 | 2/2006 |
| WO | WO-2006/020305 A2 | 2/2006 |
| WO | WO-2006/020305 A3 | 2/2006 |
| WO | WO-2006/021211 | 3/2006 |
| WO | WO-2006/021211 A2 | 3/2006 |
| WO | WO-2006/026183 | 3/2006 |
| WO | WO-2006/037545 | 4/2006 |
| WO | WO-2006/037545 A2 | 4/2006 |
| WO | WO-2006/037545 A3 | 4/2006 |
| WO | WO-2006/104745 | 10/2006 |
| WO | WO-2006/104745 A3 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2007/089766 A2 | 8/2007 |
| WO | WO-2007/089766 A3 | 8/2007 |
| WO | WO-2008/007372 | 1/2008 |
| WO | WO-2008/045414 | 4/2008 |
| WO | WO-2008/045833 | 4/2008 |
| WO | WO-2008/094791 | 8/2008 |
| WO | WO-2009/088672 | 7/2009 |

OTHER PUBLICATIONS

"Alps Electric introduces the GlidePoint Wave Keyboard; combines a gently curved design with Alps' advanced GlidePoint Technology," Business Wire (Oct. 21, 1996).
"Alps Electric Ships GlidePoint Keyboard for the Macintosh; Includes a GlidePoint Touchpad, Erase-Eaze Backspace Key and Contoured Wrist Rest," Business Wire (Jul. 1, 1996).
"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Apple Unveils Optical Mouse and New Pro Keyboard," Press Release, Jul. 19, 2000.
"APS show guide to exhibitors," Physics Today 49(3) (Mar. 1996).
"Atari VCS/2600 Peripherals," www.classicgaming.com/gamingmuseum/2006p.html, downloaded Feb. 28, 2007, pp. 1-15.
"Der Klangmeister," Connect Magazine, Aug. 1998.
"Design News literature plus," Design News 51(24) (Dec. 18, 1995).
"How do touchscreen monitors know where you're touching?" obtained from http://www.electronics.howstuffworks.com/question716.html generated Jul. 7, 2008; 2 pages.
"Manufactures," Laser Focus World, Buyers Guide '96, 31(12) (Dec. 1995).
"National Design Engineering Show," Design News 52(5) (Mar. 4, 1996).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Preview of exhibitor booths at the Philadelphia show," Air Conditioning, Heating & News 200(2) (Jan. 13, 1997).
"Product news," Design News 53(11) (Jun. 9, 1997).
"Product news," Design News 53(9) (May 5, 1997).
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
"Synaptics Tough Pad Interfacing Guide," Second Edition, Mar. 25, 1998, Synaptics, Inc., San Jose, CA, pp. 1-90.
"System Service and Troubleshooting Manual," www.dsplib.com/intv/Master, downloaded Dec. 11, 2002.
"T9® Txt Input for Keypad Devices," http://tegic.com.
"Triax Custom Controllers due; Video Game Controllers," HFD—The Weekly Home Furnishing Newspaper 67(1) (Jan. 4, 1993).
"Diamond Multimedia Announces Rio PMP300 Portable MP3 Music Player," located at http://news.harmony-central.com/Newp/1998/Rio-PMP300.html visited on May 5, 2008. (4 pages).
"Touchpad," Notebook PC Manual, ACER Information Co. Ltd., Feb. 16, 2005, pp. 11-12.
Ahl, David, "Controller Update," Creative Computing Vo. 9, No. 12, Dec. 1983.
Ahmad, "A Usable Real-Time 3D Hand Tracker," Proceedings of the 28th Asilomar Conference on Signals, Systems and Computers—Part 2 (of 2) vol. 2 (Oct. 1994).
AU Office Action dated Mar. 15, 2011, directed to counterpart application No. 2006333471; 2 pages.
Australian Examination Report dated Dec. 23, 2009, directed to SG 200600633-2; 6 pages.
Australian Examination Report dated Jul. 14, 2008, directed to counterpart application No. 2008100566; 2 pages.
Australian Examination Report dated Mar. 18, 2010, directed to counterpart Application No. 2007313960; 2 pages.
Australian Examination Report dated Oct. 28, 2010, directed to application No. 2006333471; 2 pages.
Australian Examination Report issued Aug. 26, 2009, directed to SG Application No. 200705825-8; 6 pages.
Australian Examination Report issued Jul. 22, 2008, directed to application No. 2008100383; 2 pages.
Australian OA dated Jan. 21, 2010, directed to AU 2008212040; 2 pages.
Australian OA dated Nov. 27, 2009, directed to AU 2008212040; 2 pages.
Australian OA issued Aug. 19, 2009, directed to AU 20006333374; 2 pages.
Australian OA issued Nov. 12, 2009, directed to AU 20006333374; 2 pages.
Australian OA issued Sep. 11, 2009, directed to AU 2006333471; 3 pages.
Australian Office Action issued Apr. 15, 2010, directed to AU Application No. 2006333374; 2 pages.
Australian Office Action mailed Jan. 5, 2010 directed to application No. 2007257432; 2 pages.
Australian Search Report and Written Opinion dated Aug. 20, 2008, directed to SG 200701908-6; 11 pages.
Australian Search Report and Written Opinion mailed May 10, 2010, directed to application No. 200907980-7; 11 pages.
Australian Second Written Opinion dated May 27, 2009, directed to SG 200701908-6; 11 pages.
Australian Third Written Opinion mailed Jan. 28, 2010, directed to SG 200701908-6; 6 pages.
Baig, E.C., "Your PC Just Might Need a Mouse," U.S. News & World Report 108(22) (Jun. 4, 1990).
Bang & Olufsen Telecom a/s. (2000). BeoCom 6000 User Guide; 53 pages.
Bartimo, Jim, "The Portables: Travelling Quickly," Computerworld (Nov. 14, 1983).
Beaver et al., U.S. Appl. No. 12/042,318, filed Mar. 4, 2008 entitled, "Touch Event Model"; 36 pages.

(56) References Cited

OTHER PUBLICATIONS

Boling, Douglas (1993) "Programming Microsoft Windows CE.NET," p. 109.
Bollinger et al., U.S. Office Action mailed Jun. 25, 2010, directed to U.S. Appl. No. 11/842,724; 22 pages.
Bollinger et al., U.S. Office Action mailed Mar. 21, 2011, directed to U.S. Appl. No. 11/842,724; 22 pages.
Bollinger, "U.S. Appl. No. 60/858,404, filed Nov. 13, 2006, entitled Method of Capacitively Sensing Finger Position"; 13 pages.
Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—Interact '90 (1990).
Bull, U.S. Office Action mailed Feb. 4, 2011, directed to U.S. Appl. No. 11/849,801; 22 pages.
Bull, U.S. Office Action mailed Jul. 9, 2010, directed to U.S. Appl. No. 11/849,801; 13 pages.
Buxton et al., "Issues and Techniques in Touch-Sensitive Tablet Input," Computer Graphics 19(3), Proceedings of SIGGRAPH '85 (1985).
Casario, M., "Hands on Macromedia World: Touch Screen Keypad for Mobile Phone by DoCoMo," printed Nov. 18, 2005, 1 page.
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
CN OA dated Mar. 11, 2010, directed to counterpart Application No. 2007800204967; 1 page.
CN OA issued Dec. 29, 2006, directed to CN Application No. 200510103886.3, 25 pages.
CN First Office Action dated Jun. 20, 2008 directed to corresponding application No. CN200710090406.3; 16 pages.
CN Notification for Making Corrections dated Apr. 22, 2010, directed to corresponding application No. 200920179495.3; 3 pages.
CN OA dated Apr. 21, 2010, directed to corresponding application No. 200680053632.8; 7 pages.
CN OA dated Aug. 10, 2010, directed to corresponding application No. 200680053630.9; 16 pages.
CN OA dated Aug. 14, 2009, directed to corresponding application No. CN200810000064.6; 8 pages.
CN OA dated Aug. 21, 2009, directed to corresponding application No. CN200810008293.2; 25 pages.
CN OA dated Jul. 15, 2010 directed to corresponding application No. 200710090406.3; 3 pages.
CN OA dated Jun. 9, 2006, directed to corresponding application No. CN 02820867.6; 12 pages.
CN OA dated Nov. 5, 2010, directed to counterpart application No. 200780038246.6; 8 pages.
CN OA dated Nov. 5, 2010, directed to counterpart application No. 200780042046.8; 14 pages.
CN OA dated Sep. 27, 2010, directed to corresponding application No. 200810008293.2; 8 pages.
CN Second Office Action dated Feb. 6, 2009, directed to corresponding application No. CN 200710090406.3; 25 pages.
Day, B. "Will Cell Phones Render iPods Obsolete?" http://webblogs.javanet/pub/wig/883, printed Dec. 12, 2005, 3 pages.
De Meyer, Kevin, "Crystal Optical Mouse," Feb. 14, 2002, Heatseekerz, Web Article 19.
DE OA dated Oct. 19, 2009, directed to corresponding application No. 11 2006 003 531.253, 9 pages.
Delta II™ Keypads, "Introducing the Ultimate Smartphone Keypad," http://www.chicagologic.com, printed Nov. 18, 2005, 2 pages.
DigitWireless, Fastap™ http://www.digitwireless.com/about/faq.html, Dec. 6, 2005; 5 pages.
DigitWireless, "Fastap™ Keypads Redefine Mobile Phones," http://www/digitwireless.com printed Nov. 18, 2005; 9 pages.
Elias et al., U.S. Office Action mailed Sep. 17, 2008, directed to U.S. Appl. No. 11/203,692; 8 pages.
Elias et al., U.S. Office Action mailed Feb. 23, 2009, directed to U.S. Appl. No. 11/203,692; 13 pages.
Elias et al., U.S. Office Action mailed Aug. 4, 2009, directed to U.S. Appl. No. 11/203,692; 12 pages.
Elias et al., U.S. Office Action mailed Mar. 30, 2010, directed to U.S. Appl. No. 11/203,692; 15 pages.
Elias et al., U.S. Office Action mailed Jun. 11, 2010, directed to U.S. Appl. No. 11/203,692; 17 pages.
Elias et al., U.S. Office Action mailed Nov. 22, 2010, directed to U.S. Appl. No. 11/203,692; 6 pages.
Elias et al., U.S. Appl. No. 60/522,107, filed Aug. 16, 2004, entitled, "A Method for Increasing the Spatial Resolution of Touch Sensitive Devices"; 15 pages.
EP Communication Pursuant to Article 94(3) EPC for corresponding EP Application No. 02 776 261.6 dated Oct. 2, 2008.
EP Communication Pursuant to Article 94(3) EPC for corresponding Application No. 02 773 855.8 dated Mar. 5, 2008; 7 pages.
EP Communication pursuant to Article 94(3) EPC for corresponding application No. 02 773 855.8 dated Jun. 24, 2010; 5 pages.
EP Communication pursuant to Article 96(2) EPC for corresponding EP Application No. 02 776 261.6 dated Apr. 13, 2006.
EP Communication Pursuant to Article 96(2) EPC for corresponding EP Application No. 02 776 261.6 dated Jun. 28, 2007.
EP Communication Pursuant to Article 94(3) EPC dated Jul. 16, 2009, directed towards counterpart EP Application No. 04 781 727.5 ; 6 pages.
EP Communication Pursuant to Article 94(3) EPC dated Jun. 24, 2010, directed to application No. 05786737.6; 8 pages.
EP Communication Pursuant to Article 94(3) EPC dated Jun. 29, 2010 directed to corresponding application No. 02 776 261.6; 4 pages.
EP Communication Pursuant to Article 94(3) EPC dated Aug. 13, 2009, directed to Application No. 06 838 571.5; 5 pages.
EP Communication Pursuant to Article 94(3) EPC dated Jan. 11, 2008, directed towards counterpart EP application No. 04 781 727.5.
EP Communication Pursuant to Article 94(3) EPC dated Sep. 2, 2009, directed to Application No. 05786737.6; 5 pages.
EP Communication Pursuant to Article 94(3) EPC dated Oct. 30, 2009, directed to application No. 09161792.8; 5 pages.
EP Communication Pursuant to Article 94(3) EPC dated Dec. 15, 2009, directed to application No. 07025123.6; 4 pages.
EP OA mailed Oct. 7, 2008, directed to EP Application No. 05255454.0.
EP Search Report mailed Apr. 12, 2007, directed towards counterpart EP application No. 04 781 727.5.
EP Search Report mailed Jul. 6, 2009 directed towards counterpart application No. 09161792.8; 7 pages.
EP Third Party Observations Under Article 115 EPC for corresponding EP Application No. 02 776 261.6 dated Oct. 24, 2008; 12 pages.
EP Third Party Observations Under Article 115 EPC for corresponding EP Application No. 02773855.8 dated Nov. 28, 2008; 13 pages.
European Office Action dated Jan. 29, 2009, directed to counterpart application No. 06838570.7; 7 pages.
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Final Office Action mailed Mar. 24, 2011, for U.S. Appl. No. 11/591,752, filed Nov. 1, 2006, 11 pages.
Fiore, "Zen Touchpad," Cornell University, May 2000.
Fisher et al., U.S. Appl. No. 61/036,804, filed Mar. 14, 2008 entitled "Switchable Sensor Configurations"; 46 pages.
Forsblad et al., U.S. Office Action mailed Jan. 26, 2009, directed to U.S. Appl. No. 11/355,022; 15 pages.
Forsblad et al., U.S. Office Action mailed Jan. 27, 2009, directed to U.S. Appl. No. 11/882,421; 15 pages.
Forsblad et al., U.S. Office Action mailed Jun. 25, 2009, directed to U.S. Appl. No. 11/355,022; 18 pages.
Gadgetboy, "Point and click with the latest mice," CNET Asia Product Review, www.asia.cnet.com/reviews . . . are/gadgetboy/ 0,39001770,380235900,00.htm, downloaded Dec. 5, 2001.
GB Examination Report dated Jun. 22, 2009, directed to counterpart Application No. GB0908021.9; 3 pages.

(56) References Cited

OTHER PUBLICATIONS

GB Examination Report dated May 11, 2009, directed to counterpart Application No. GB0805359.7; 2 pages.
GB Search Report mailed Feb. 9, 2009, directed to counterpart GB Application No. 0811605.5; 4 pages.
German Office Action mailed Jul. 26, 2010 directed to counterpart application No. 112006003531.2; 6 pages.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Gibbs, K. "I've Got a Suggestion," posted on the Google Blog, Dec. 10, 2004, http://googleblog.blogspot.com.
Google, "Google Suggest FAQ," Google.com, retrieved on Apr. 1, 2009, from http://labs.google.com/suggestfaq.
Grignon et al., U.S. Appl. No. 60/755,656, filed Dec. 30, 2005, entitled "Touch Pad with Feedback"; 109 pages.
Halfbakery, "Rotary cell-phone keypad," 3 pages, Feb. 2002, http://halfbakery.com/idea/Rotary_20cell-phone_20keypad.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Hotelling, U.S. Office Action mailed Sep. 1, 2009, directed to U.S. Appl. No. 11/482,286; 14 pages.
Hotelling, U.S. Office Action mailed Jan. 25, 2010, directed to U.S. Appl. No. 11/482,286; 17 pages.
Hotelling et al., U.S. Office Action mailed Mar. 30, 2010, directed to U.S. Appl. No. 11/483,008; 20 pages.
Hotelling, U.S. Office mailed Jun. 9, 2010, directed to U.S. Appl. No. 11/482,286; 21 pages.
Hotelling, U.S. Office Action mailed Aug. 18, 2010, directed to U.S. Appl. No. 11/882,424; 16 pages.
Hotelling, U.S. Office Action mailed Oct. 1, 2010, directed to U.S. Appl. No. 11/482,286; 28 pages.
Hotelling et al., U.S. Office Action mailed Oct. 27, 2010, directed to U.S. Appl. No. 11/483,008; 23 pages.
Hotelling, U.S. Office Action mailed Dec. 8, 2010, directed to U.S. Appl. No. 11/482,286; 33 pages.
Hotelling, U.S. Appl. No. 60/658,777 titled "Multi-Functional Handheld Device," filed Mar. 4, 2005; 68 pages.
Interlink Electronics, VersaPad: Integration Guide, © 1998 (VersaPad), pp. 1-35.
International Report on Patentability and Written Opinion issued May 19, 2009, directed to corresponding Application No. PCT/US2007/084549.
International Report on Patentability issued Apr. 15, 2009, directed to counterpart Application No. PCT/US2007/080704; 6 pages.
International Search Report and Written Opinion mailed Oct. 19, 2009, directed to PCT/US2008/085137; 15 pages.
International Search Report and Written Opinion mailed May 20, 2010, directed to counterpart application No. PCT/US2009/036806; 12 pages.
International Search Report received in International Application No. PCT/US2007/060120, mailed May 29, 2007.
IPRP and Written Opinion mailed Jul. 1, 2008, directed to PCT/US2006/045682; 9 pages.
IPRP and Written Opinion mailed Dec. 22, 2009, directed to PCT/US2007/080709; 15 pages.
IPRP and Written Opinion mailed Sep. 14, 2010, directed to counterpart application No. PCT/US2009/036806; 7 pages.
IPRP and Written Opinion mailed Dec. 3, 2010, directed to counterpart application No. PCT/US2009/068276; 10 pages.
IPRP mailed Sep. 16, 2009, directed to corresponding Application No. PCT/US2008/076516; 9 pages.
IPRP mailed Dec. 23, 2009, directed to corresponding application No. PCT/US2008/075212; 30 pages.
IPRP mailed Jun. 8, 2010 directed to counterpart PCT/US2008/085137; 10 pages.
IPRP mailed Sep. 27, 2010 directed to counterpart application No. PCT/US2009/058054; 12 pages.
IPRP mailed Dec. 6, 2010, directed to counterpart PCT/US2009/054926; 9 pages.
ISR and Written Opinion dated Dec. 6, 2007, directed to International Application No. PCT/US2007/015501.
ISR and Written Opinion mailed Mar. 12, 2008, directed to counterpart international application No. PCT/US2007/080708.
ISR and Written Opinion mailed Mar. 19, 2008 directed to counterpart international application No. PCT/US2007/080704.
ISR and Written Opinion dated Dec. 10, 2008, directed to counterpart international application No. PCT/US2008/076516; 13 pages.
ISR and Written Opinion issued Jul. 31, 2009, directed to corresponding Application No. PCT/US2008/075212; 15 pages.
ISR and Written Opinion mailed Nov. 6, 2009, directed to counterpart PCT/US2009/030621; 14 pages.
ISR and Written Opinion mailed Feb. 18, 2010, directed to counterpart PCT/US2009/054926; 14 pages.
ISR and Written Opinion mailed Sep. 17, 2010, directed to counterpart application No. PCT/US2009/055875; 21 pages.
ISR dated Oct. 15, 2003 directed to corresponding application No. PCT/US2002/33805; 6 pages.
ISR dated Oct. 16, 2003 directed to corresponding application No. PCT/US02/33861; 4 pages.
ISR mailed May 7, 2007, directed to corresponding application No. PCT/US2006/045682; 2 pages.
ISR mailed Mar. 4, 2008, directed to counterpart International application No. PCT/US2007/010639; 3 pages.
ISR mailed Jul. 8, 2008, directed to PCT/US2007/080709.
Jesitus, John, "Broken promies?", Industry Week/IW 246(20) (Nov. 3, 1997).
JP Decision for Refusal dated Apr. 5, 2010, directed to counterpart application No. 2009156554; 4 pages.
JP Notification of Reasons for Rejection for corresponding Japanese Application No. 2003-538879 dated Sep. 12, 2006, with translation.
JP Notification of Reasons for Rejection for corresponding Japanese Application No. 2008-179252 dated Nov. 18, 2008, 6 pages
JP Notification of Reasons for Rejection for corresponding Japanese Application No. 2008-179261 dated Feb. 10, 2009; 7 pages.
JP OA mailed Aug. 19, 2008, directed to counterpart JP Application No. 2006-523894; 4 pages.
JP OA mailed Jan. 5, 2009, directed counterpart JP Application No. 2007-525885; 1 page.
JP OA mailed Jun. 9, 2009, directed to counterpart Application No. 2008-179252; 4 pages.
JP OA dated Sep. 28, 2009, directed to counterpart application No. 2009-156554; 2 pages.
JP OA dated Nov. 17, 2009, directed to corresponding JP Application No. 2008-179261, 4 pages.
JP OA mailed Jan. 4, 2010, directed to counterpart JP Application No. 2007-525885; 2 pages.
JP OA mailed Aug. 2, 2010, directed towards counterpart JP application No. 2008-179261; 3 pages.
JP OA mailed Oct. 25, 2010, directed to counterpart JP Application No. 2007-525885; 10 pages.
JP OA mailed Dec. 6, 2010, directed to counterpart application No. 2009-156554; 7 pages.
KIPO'S Notice of Final Rejection dated Mar. 23, 2010, directed to counterpart Application No. 10-2007-7029791; 5 pages.
KIPO'S Notice of Preliminary Rejection dated Jul. 9, 2009, directed to KR Application No. 10-2007-7020677; 5 pages.
KIPO'S Notice of Preliminary Rejection dated Feb. 19, 2010, directed to counterpart application No. 10-2008-7018716; 9 pages.
KIPO'S Notice of Preliminary Rejection dated Mar. 3, 2010, directed towards corresponding KR Application No. 10-2009-7024888, 7 pages.
KIPO'S Notice of Preliminary Rejection dated Apr. 1, 2010, directed to counterpart application No. 10-2009-7017577; 6 pages.
KIPO'S Notice of Preliminary Rejection dated May 3, 2010, directed to counterpart application No. 10-2010-7001333; 4 pages.
KIPO'S Notice of Preliminary Rejection dated Jul. 26, 2010, directed towards KR application No. 10-2010-7014838; 7 pages.
KIPO'S Notice of Preliminary Rejection dated Sep. 29, 2010, directed to counterpart application No. 10-2008-7032038; 4 pages.

(56) References Cited

OTHER PUBLICATIONS

KIPO'S Notice of Preliminary Rejection dated Oct. 29, 2010, directed to counterpart application No. 10-2009-7017577; 4 pages.
KIPO'S Notice of Preliminary Rejection dated Nov. 25, 2010, directed to counterpart application No. 10-2010-7001333; 5 pages.
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1994) "Development of the Touch Switches with the Click Response," Koukuu Denshi Gihou No. 17, pp. 44-48 (published by the Japan Aviation Electronics Industry, Ltd.).
Kobayashi et al. (1997) "Dynamic Soundscape: Mapping Time to Space for Audio Browsing," Computer Human Interaction: 16 pages.
KR Advance Notice of Disapproval of Divisional Application for corresponding Korean Application No. 10-2008-7000097 with partial translation.
KR Intellectual Property Tribunal Decision for corresponding Korean Application No. 10-2004-7005119 dated Jul. 16, 2008, with partial translation.
KR Notice of Dismissal of Amendment for corresponding Korean Application No. 10-2004-7005119 dated Feb. 11, 2008, with translation.
KR Notice of Preliminary Rejection dated Mar. 2, 2009 directed to corresponding KR Application No. 10-2007-7012309; 6 pages.
KR Notice of Preliminary Rejection dated Oct. 20, 2009, directed to corresponding KR-10-2007-7029791 with translation.
KR Notice of Preliminary Rejection dated Oct. 21, 2009, directed to corresponding KR-10-2007-7027380 with translation.
KR Notice of Preliminary Rejection for corresponding Korean Application No. 10-2008-7000097 dated Dec. 19, 2008, with translation.
KR Notice of Preliminary Rejection for corresponding Korean Application No. 10-2008-7000097 dated Jul. 30, 2009, with translation.
KR Notification of Provision Rejection for corresponding Korean Application No. 10-2004-7005119 dated Aug. 29, 2009, with translation.
KR Notification of Provisional Rejection for corresponding Korean Application No. 10-2004-7005119 dated Jan. 9, 2006, with translation.
KR Office Action mailed Feb. 26, 2008, directed to counterpart KR Application No. 10-2006-7003255; 9 pages.
KR Office Action mailed Oct. 23, 2008 directed to counterpart KR Application No. 10-2006-7003255; 5 pages.
KR Office Action mailed Apr. 29, 2009 directed to counterpart Application No. 10-2006-7003255; 8 pages.
Lampell et al., U.S. Office Action mailed Dec. 22, 2010, directed to U.S. Appl. No. 11/882,427; 16 pages.
Lampell et al., U.S. Appl. No. 60/810,423, filed Jun. 2, 2006, entitled "Techniques for Interactive Input to Portable Electronic Devices"; 53 pages.
Lampell, U.S. Office Action mailed Dec. 3, 2010, directed to U.S. Appl. No. 11/530,807; 17 pages.
Lampell, U.S. Office Action mailed Jun. 4, 2010, directed to U.S. Appl. No. 11/530,807; 15 pages.
Lampell, U.S. Office Action mailed Sep. 15, 2009, directed to U.S. Appl. No. 11/530,807; 15 pages.
Lee, S.K. et al. (Apr. 1985). "A Multi-Touch Three Dimensional Touch-Sensitive Tablet," Proceedings of CHI: ACM Conference on Human Factors in Computing Systems, pp. 21-25.
Letter re: Bang & Olufsen a/s by David Safran, Nixon Peabody, LLP, May 21, 2004, with BeoCom 6000 Sales Training Brochure, 7 pages.
Liu, J. "At a Loss for Words?", Posted on the Google blog, Aug. 25, 2008, http://googleblog.blogspot.com.
Luna Technologies International, Inc., LUNA Photoluminescent Safety Products, "Photoluminescence—What is Photoluminescence?" from website at http://www.lunaplast.com/photoluminescence.com on Dec. 27, 2005.
Lynch et al., U.S. Office Action mailed Oct. 5, 2009, directed to U.S. Appl. No. 11/499,360; 7 pages.
Lynch et al., U.S. Office Action mailed Jan. 27, 2010, directed to U.S. Appl. No. 11/499,360; 8 pages.
Marriott et al., U.S. Appl. No. 10/722,948, filed Nov. 25, 2003.
Marriott et al., U.S. Office Action mailed Jun. 2, 2006, directed to U.S. Appl. No. 10/722,948; 12 pages.
Marriott et al., U.S. Office Action mailed Dec. 12, 2006, directed to U.S. Appl. No. 10/722,948; 14 pages.
Marriott et al., U.S. Office Action mailed Jul. 13, 2007, directed to U.S. Appl. No. 10/722,948; 15 pages.
Marriott et al., U.S. Office Action mailed Jan. 30, 2008, directed to U.S. Appl. No. 10/722,948; 17 pages.
Marriott et al., U.S. Office Action mailed Aug. 19, 2010, directed to U.S. Appl. No. 11/882,422; 13 pages.
McAlister, J. "News + Suggest Join Forces," Apr. 28, 2006, posted on the Google Blog, http://googleblog.blogspot.com.
McKillop et al., U.S. Office Action mailed Sep. 16, 2010, directed to U.S. Appl. No. 11/591,752; 14 pages.
Mims, Forrest M., III, "A Few Quick Pointers; Mouses, Touch Screens, Touch Pads, Light Pads, and the Like Can Make System Easier to Use," Computers & Electronics (22) (May 1984).
MobileTouch "Synaptics: Handy Wie Einen iPod Bedienen," Sep. 21, 2004, 1 page, http://www.golem.de/0409/33706.html.
Nass, Richard, "Touchpad input device goes digital to give portable systems a desktop 'mouse-like' feel," Electronic Design 44(18) (Sep. 3, 1996).
Ng et al., U.S. Office Action mailed Jan. 14, 2010, directed to U.S. Appl. No. 11/394,493; 20 pages.
Ng et al., U.S. Office Action mailed Jan. 15, 2010, directed to U.S. Appl. No. 11/882,423; 22 pages.
Ng et al., U.S. Office Action mailed Jun. 22, 2010, directed to U.S. Appl. No. 11/394,493; 14 pages.
Ng et al., U.S. Office Action mailed Jul. 8, 2010, directed to U.S. Appl. No. 11/882,423; 19 pages.
Ng et al., U.S. Office Action mailed Oct. 26, 2010, directed to U.S. Appl. No. 11/882,423; 18 pages.
Ng et al., U.S. Office Action mailed Dec. 9, 2010, directed to U.S. Appl. No. 11/394,493; 13 pages.
Nokia, "7280 Bedienungsanleitung" 2005, pp. 1-149, http://web.archive.org/web/20051222023851/http://nds1.nikia.com/phones/files/guides/nokia7280_UDG-de.pdf.
Nokia, "7280 Interaktive Demos" screenshot Nov. 25, 2005, 1 page, http://web.archive.org/web/2005112502636/europe.nokia.com/support/tutorials/7280/german/index.htm.
Nokia, "Nokia 7280 User manual," Nov. 25, 2004, 132 pages, http://nds1.nokia.com/phones/files/guides/Nokia_7280_UG-en.pdf.
Nokia, "Nokia 7280: Interactive Demonstrations," 7 pages, 2004, http://nokia.com/EUROPE_NOKIA_COM_3/r2/support/tutorials/7280/english/indes.html.
Non-Final Office Action mailed Mar. 6, 2012, for U.S. Appl. No. 11/591,752, filed Nov. 1, 2006, 11 pages.
Office Action dated Apr. 7, 2009, received in U.S. Appl. No. 11/459,612.
Office Action dated Aug. 6, 2009, received in U.S. Appl. No. 11/459,612.
Office Action dated Dec. 28, 2009, received in U.S. Appl. No. 11/459,609.
Office Action dated Feb. 4, 2009, received in U.S. Appl. No. 11/459,609.
Office Action dated Jun. 25, 2009, received in U.S. Appl. No. 11/549,619.
Office Action dated May 5, 2010, received in U.S. Appl. No. 11/459,612; 23 pages.
Office Action dated Nov. 3, 2008, received in U.S. Appl. No. 11/459,612.
Office Action dated Oct. 2, 2009, received in U.S. Appl. No. 11/459,609.
Office Action dated Oct. 28, 2008, received in U.S. Appl. No. 11/459,610.
Official inquiry from the Appeal Board dated May 24, 2010, directed to JP Application No. 2003-538879 (Appeal No. 2008-14504); 10 pages.

(56) References Cited

OTHER PUBLICATIONS

O'Neal, W., Sr. E., et al., "Smart Phones with Hidden Keybaords," printed Nov. 18, 2005, 3 pages, http://msc.com/4250-6452_16-6229969-1.html.
Partial ISR mailed May 28, 2010, directed to counterpart PCT/US2009/055875; 8 pages.
Partial Search Report mailed Feb. 7, 2008, directed to International Application No. PCT/US2007/015500.
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Phoneyworld, "You heard of Touch Screens Now Check Out Touch Keys" printed Nov. 18, 2005, 2 pages, http://www.phoneyworld.com.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/812,384; 29 pages.
Prest et al., U.S. Office Action mailed Jun. 23, 2010, directed to U.S. Appl. No. 11/882,889; 13 pages.
Prest et al., U.S. Appl. No. 60/850,662, filed Oct. 11, 2006, entitled, "Capacitive Scroll Wheel"; 21 pages.
Rathnam et al., U.S. Office Action mailed Mar. 24, 2011, directed to U.S. Appl. No. 12/205,757; 14 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Robbin et al., U.S. Office Action mailed Sep. 30, 2004, directed to U.S. Appl. No. 10/259,159; 14 pages.
Robbin et al., U.S. Office Action mailed Jun. 16, 2005, directed to U.S. Appl. No. 10/259,159; 16 pages.
Robbin et al., U.S. Office Action mailed Jan. 11, 2006, directed to U.S. Appl. No. 10/259,159; 15 pages.
Robbin et al., U.S. Office Action mailed Aug. 3, 2006, directed to U.S. Appl. No. 10/259,159; 15 pages.
Robbin et al., U.S. Office Action mailed Oct. 13, 2006, directed to U.S. Appl. No. 10/259,159; 18 pages.
Robbin et al., U.S. Office Action mailed Jan. 18, 2007, directed to U.S. Appl. No. 10/259,159; 18 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Robbin et al., U.S. Office Action mailed Oct. 29, 2010, directed to U.S. Appl. No. 11/838,845; 8 pages.
Robbin et al., U.S. Office Action mailed Apr. 26, 2011, directed to U.S. Appl. No. 11/838,845; 9 pages.
Robbin et al., U.S. Appl. No. 11/610,384 entitled "Method and Apparatus for Use of Rotational User Inputs," filed Dec. 13, 2006.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Robbin, U.S. Appl. No. 11/610,376 entitled, "Method and Apparatus for Use of Rotational User Inputs, " filed Dec. 13, 2006.
Robbin, U.S. Appl. No. 60/346,237 entitled, "Method and System for List Scrolling," filed Oct. 22, 2001; 12 pages.
Rothkopf, et al., U.S. Appl. No. 12/204,401 entitled "Compact Input Device," filed Sep. 4, 2008; 54 pages.
Rothkopf, U.S. Appl. No. 60/935,854 titled "Compact Media Players," filed Sep. 4, 2007; 36 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI'92, pp. 659-660.
SanDisk Sansa Connect User Guide, 2007; 29 pages.
Sears, A., et al., "Data Entry for Mobile Devices Using Soft Keyboards: Understanding the Effects of Keybaord Size and User Tasks," Abstract, Int'l Journal of Human-Computer Interaction, 2003, vol. 16, No. 2, 23 pages.
Soderholm, Lars G., "Sensing Systems for 'Touch and Feel,'" Design News (May 8, 1989): pp. 72-76.
Solutions for Humans, "Compare Keyboards with the Keyboard Compatibility Chart, Learn More About Alternative Keyboards," printed Dec. 8, 2005, 5 pages, http://www.keyalt.com/kkeybrdp.htm.
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Summons to attend oral proceedings pursuant to Rule 115(1) EPC mailed Feb. 10, 2010, directed application No. 05255454.0; 9 pages.
Summons to attend oral proceedings pursuant to Rule 115(1) EPC mailed Dec. 2, 2010, directed EP application No. 05786737.6; 7 pages.
Sylvania, "Intellvision™ Intelligent Television Master Component Service Manual," pp. 1, 2 and 8, 1979.
Technology Loan Catalog, "Devices," printed Jun. 6, 2008, 9 pages. http://www.tsbvi.edu/outreach/techloan/catalog.html.
Tessler, Franklin, "Point Pad," Macworld 12(10) (Oct. 1995).
Tessler, Franklin, "Smart Input: How to Chose from the New Generation of Innovative Input Devices," Macworld 13(5) (May 1996).
Tessler, Franklin, "Touchpads," Macworld 13(2) (Feb. 1996).
Textually, "LG Develops New Touch Pad Cell Phones," printed Nov. 18, 2005, 1 pages, http://textually.org/textually/archives/2005/06/009903.htm.
Textually, "Microsoft New-Smart Phone Interface: Your Thumb," printed Nov. 18, 2005, 2 pages, http://www.textually.org.
Textually, "Samsung Releases Keyboard Phone in US," printed Nov. 18, 2005, 1 page, http://www.textually.org/textually/archives/2005/11/010482.htm.
Torrone, P., "Google Suggest: The Movie," Dec. 11, 2004, posted on www.Engadget.com.
Translation of Trekstor's Defense Statement to the District Court Mannheim of May 23, 2008; 37 pages.
Tsuk et al., U.S. Office Action mailed Sep. 30, 2004, directed to U.S. Appl. No. 10/256,716; 11 pages.
Tsuk et al., U.S. Office Action mailed Jun. 24, 2005, directed to U.S. Appl. No. 10/256,716; 12 pages.
Tsuk et al., U.S. Office Action mailed Jan. 10, 2006, directed to U.S. Appl. No. 10/256,716; 12 pages.
Tsuk et al., U.S. Office Action mailed Aug. 3, 2006, directed to U.S. Appl. No. 10/256,716; 15 pages.
Tsuk et al., U.S. Office Action mailed Oct. 13, 2006, directed to U.S. Appl. No. 10/256,716; 16 pages.
Tsuk et al., U.S. Office Action mailed Jul. 7, 2009, directed to U.S. Appl. No. 11/610,190; 24 pages.
Tsuk et al., U.S. Office Action mailed Aug. 7, 2009, directed to U.S. Appl. No. 11/610,181; 20 pages.
Tsuk et al., U.S. Office Action mailed Dec. 31, 2009, directed to U.S. Appl. No. 11/610,190; 25 pages.
Tsuk et al., U.S. Office Action mailed Apr. 28, 2010, directed to U.S. Appl. No. 11/610,190; 29 pages.
Tsuk et al., U.S. Office Action mailed Aug. 6, 2010, directed to U.S. Appl. No. 11/610,190; 30 pages.
Tsuk et al., U.S. Office Action mailed Oct. 26, 2010, directed to U.S. Appl. No. 11/959,942; 27 pages.

(56) References Cited

OTHER PUBLICATIONS

Tsuk et al., U.S. Office Action mailed Nov. 1, 2010, directed to U.S. Appl. No. 11/959,918; 8 pages.
Tsuk et al., U.S. Office Action mailed Mar. 31, 2011, directed to U.S. Appl. No. 11/959,918; 9 pages.
Tsuk et al., U.S. Office Action mailed Apr. 19, 2011, directed to U.S. Appl. No. 11/610,190; 25 pages.
Tsuk et al., U.S. Appl. No. 11/610,181, entitled "Method and Apparatus for Accelerated Scrolling," filed Dec. 13, 2006.
Tsuk et. al., U.S. Appl. No. 11/610,190, entitled "Method and Apparatus for Accelerated Scrolling," filed Dec. 13, 2006.
U.S. Appl. No. 10/060,712, filed Jan. 29, 2002.
U.S. Appl. No. 10/209,537, filed Jul. 30, 2002.
U.S. Appl. No. 10/259,159, entitled "Method and Apparatus for Use of Rotational User Inputs," filed Sep. 26, 2002.
U.S. Appl. No. 10/889,933, filed Jul. 12, 2004 entitled, "Handheld Devices as Visual Indicators"; 42 page.
U.S. Appl. No. 11/394,493, titled "Illuminated Touchpad", filed Mar. 32, 2006.
U.S. Appl. No. 11/482,286, titled "Mutual Capacitance Touch Sensing Device", filed Jul. 6, 2006.
U.S. Appl. No. 11/483,008, titled "Capacitance Sensing Electrode With Integrated I/O Mechanism", filed Jul. 6, 2006.
Web Archive: web.archive.org/web/*/http://nds1.nokia.com/phones/files/guides/Nokia_7280_UG_en.pdf; Jun. 19, 2009.
Weber et al., U.S. Office Action mailed Jun. 7, 2010, directed to U.S. Appl. No. 11/856,530; 15 pages.
Weber et al., U.S. Office Action mailed Oct. 13, 2010, directed to U.S. Appl. No. 12/205,795; 15 pages.
Weber et al., U.S. Office Action mailed Jan. 7, 2011, directed to U.S. Appl. No. 11/856,530; 13 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
WikiPodLinux, "Four-Button Keyboard," printed Dec. 5, 2005, 2 pages, http://ipodlinux.org/Four-Button_Keyboard.
WikiPodLinux, "Text Input (legacy)," downloaded Dec. 5 2005, 8 pages, http://ipodlinux.org/Text_Input_%28legacy%29.
WikiPodLinux, "Text Input Concepts," Dec. 2005, printed Jun. 17, 2008, 3 pages, http://web/archive.org/web/20051211162524/http://ipodlinux.org/Text_Input_Concepts.
WikiPodLinux, "Text Input Methods," printed Dec. 5, 2005, 8 pages, http://ipodlinux.org/Text_Input_Methods.
Zadesky et al., U.S. Office Action mailed Mar. 4, 2004, directed to U.S. Appl. No. 10/188,182; 8 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Oct. 27, 2006, directed to U.S. Appl. No. 10/643,256; 14 pages.
Zadesky et al., U.S. Office Action mailed Mar. 23, 2007, directed to U.S. Appl. No. 10/643,256; 11 pages.
Zadesky et al., U.S. Office Action mailed Jul. 13, 2007, directed to U.S. Appl. No. 10/643,256; 13 pages.
Zadesky et al., U.S. Office Action mailed Oct. 4, 2007, directed to U.S. Appl. No. 11/386,238; 12 pages.
Zadesky et al., U.S. Office Action mailed Oct. 4, 2007, directed to U.S. Appl. No. 11/806,957; 14 pages.
Zadesky et al., U.S. Office Action mailed Nov. 20, 2007, directed to U.S. Appl. No. 11/057,050; 33 pages.
Zadesky et al., U.S. Office Action mailed Dec. 12, 2007, directed to U.S. Appl. No. 10/643,256; 12 pages.
Zadesky et al., U.S. Office Action mailed Jul. 9, 2008, directed to U.S. Appl. No. 10/643,256; 12 pages.
Zadesky et al, U.S. Office Action mailed Aug. 19, 2008, directed to U.S. Appl. No. 11/057,050; 23 pages.
Zadesky et al., U.S. Office Action mailed Nov. 26, 2008, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Feb. 20, 2009, directed to U.S. Appl. No. 11/057,050; 25 pages.
Zadesky et al., U.S. Office Action mailed Mar. 5, 2009, directed to U.S. Appl. No. 11/477,469; 12 pages.
Zadesky et al., U.S. Office Action mailed Aug. 6, 2009, directed to U.S. Appl. No. 11/057,050; 30 pages.
Zadesky et al., U.S. Office Action mailed Feb. 4, 2010, directed to U.S. Appl. No. 11/477,469; 14 pages.
Zadesky et al., U.S. Office Action mailed Mar. 30, 2010, directed to U.S. Appl. No. 11/592,679; 13 pages.
Zadesky et al., U.S. Office Action mailed Aug. 2, 2010, directed to U.S. Appl. No. 11/882,004; 9 pages.
Zadesky et al., U.S. Office Action mailed Sep. 29, 2010, directed to U.S. Appl. No. 11/882,003; 13 pages.
Zadesky et al., U.S. Office Action mailed Oct. 4, 2010, directed to U.S. Appl. No. 11/057,050; 31 pages.
Zadesky et al., U.S. Office Action mailed Nov. 16, 2010, directed to U.S. Appl. No. 11/477,469; 13 pages.
Zadesky et al, U.S. Office Action mailed Feb. 1, 2011, directed to U.S. Appl. No. 11/882,004; 16 pages.
Zadesky et al., U.S. Office Action mailed Mar. 16, 2011, directed to U.S. Appl. No. 11/882,003; 12 pages.
Zadesky et al., U.S. Office Action mailed Mar. 31, 2011, directed to U.S. Appl. No. 11/882,005; 7 pages.
Zadesky et al., U.S. Appl. No. 60/359,551 entitled "Touchpad for Handheld Device," filed Feb. 25, 2002; 34 pages.
Zadesky et al., U.S. Appl. No. 60/714,609 entitled "Scrolling Input Arrangements Using Capacitive Sensors on a Flexible Membrane," filed Sep. 6, 2005; 17 pages.
McKillop et al., U.S. Office Action mailed Oct. 25, 2012, directed to U.S. Appl. No. 11/591,752; 11 pages.
About Quicktio®www.loaicad3d.com/docs/at.html downloaded Apr. 8, 2002.
Alps Electric introduces the GlidePoint Wave Keyboard; combines a gently curved design with Alps' advanced GlidePoint Technology, Business Wire, (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
Apple Computer, Inc., "Block Diagram and Buses" Apple Developer Connection, Aug. 3, 2004 downloaded from the Internet from http://developer.apple.com/documentation/Hardware/Developer_Notes/Macintosh_CPUs-G . . . (4 pages).
Apple Computer, Inc., "Powerbook G4" Technology Overview, Apr. 2004 (29 pages).
Apple Presents iPod: Ultra-Portable MP3 Music Player Puts 1,000 Songs in Your Pocket, retreived from htto:l/www.annle.com/or/librarv/2001/oct/23iood.html on Oct. 23, 2001.
Apple Unveils Optical Mouse and New Pro Keyboard, Press Release, Jul. 19, 2000.
APS show guide to exhibitors, Physics Today, 49(3) (Mar. 1996).
Atari VCS/2600 Peripherals, www.classicgaming.com, downloaded Feb. 28, 2007, pp. 1-15.
BeoCom 6000, Sales Trainino Brochure, date unknown.
Der Klanomeister, Connect Maoazine, Auoust 1998.
Design News literature plus, Design News, 51(24) (Dec. 18, 1995).
Diamond Multimedia Announces Rio PMP300 Portable MP3 Music Player, located at http://news.harmony-central.com/Newp/1998/Rio-PMP300.html visited on May 5, 2008. (4 pages).
European Search Report mailed Apr. 24, 2012, for EP Application No. 12160763.4, filed Dec. 23, 2008, nine pages.

(56) References Cited

OTHER PUBLICATIONS

Evans et al., "Tablet-based Valuators that Provide One, Two, or Three Degrees of Freedom", Computer Graphics 15(3) (Aug. 1981).
Extended European Search Report dated Mar. 4, 2015, for EP Patent Application No. 14188138.3; nine pages.
Extended European Search Report dated Sep. 6, 2011, directed to EP Patent Application No. 10011508.8; 10 pages.
Final Office Action mailed Apr. 12, 2012, for U.S. Appl. No. 12/242,772, filed Sep. 30, 2008, 24 pages.
Gadgetboy, "Point and click with the latest mice," CNET Asia Product Review, www.asia.cnet.com/reviews . . . are/gadgetbol£/O 39001770 380235900,00.htm, downloaded Dec. 5, 2001.
GB Combined Examination and Search Report mailed Nov. 26, 2010, for GB Application No. 1018237.6, filed Dec. 18, 2008, six pages.
Gfroerer, "Photoluminescence in Analysis of Surfaces and Interfaces," Encyclopedia of Ana)ylical Chemistry, DD. 1-23, Copyright John Wiley & Sons Ltd, Chichester, 2000.
Manufactures, Laser Focus World, Buyers Guide '96, 31(12) (Dec. 1995).
Neuros MP3 Dioital Audio Computer, www.neurosaudio.com, downloaded Apr. 9, 2003.
Non-Final Office Action mailed Oct. 12, 2011, for U.S. Appl. No. 12/242,772, filed Sep. 30, 2008, 17 pages.
Non-Final Office Action mailed May 12, 2015, for U.S. Appl. No. 14/535,101, filed Nov. 6, 2014, seven pages.
OEM Touchpad Modules website www.glidepoint.com/sales/modules.index.shtml, downloaded Feb. 13, 2002.
Photographs of Innovation 2000 Best of Show Award Presented at the 2000 Int'l CES Innovations Design & Engineering Showcase, Jan. 6, 2000, 1 page.
Preview of exhibitor booths at the Philadelphia show, Air Conditioning Heating & Refrigerator News, 200(2) (Jan. 13, 1997).
Product news, Design News, 53(11) (Jun. 9, 1997).
Product news, Design News, 53(9) (May 5, 1997).
Product Overview—ErgoCommander®, www.logi cad3d.com/products/ErgoCommander.htm downloaded Apr. 8, 2002.
Product Overview—SpaceMouse® Classic, www.logicad3d.com/products/Classic.htm downloaded Apr. 8, 2002.
Summons to attend oral proceedings pursuant to Rule 115(1) EPC dated Jan. 6, 2014, directed to EP Application No. 05255454.0; 14 pages.
Synaptics Tough Pad Interfacing Guide, Second Edition, Mar. 25, 1998, Synaptics, Inc., San Jose, CA, paoes 1-90.
System Service and Troubleshooting Manual, www.dsplib.com/i ntv/Master, downloaded Dec. 11, 2002.
TouchPad Advanced Features, Synaptics, "Enriching the Interaction Between Humans and Intelligent Devices," Downloaded Aug. 16, 2004 (2 pages) http://www.synaptics.com/products/touchpad_features.cfm.
Touchpad, Notebook PC Manual, ACER Information Co. Ltd., Feb. 16, 2005, pp. 11-12.
Trackpad, Apple Developer Connection (last updated Apr. 19, 2004, printed Aug. 19, 2004) (3 pages) http://developer.apple.com/documentation/Hardware/Developer_Notes/Macintosh_CPUs- . . . .
Triax Custom Controllers Due; Video Game Controllers, HFD-The Weekly Home Furnishings Newspaper 67(1) (Jan. 4, 1993).
Chinese Search Report mailed Jan. 11, 2016, for CN Application No. 201310489261.x, two pages.
Final Office Action mailed Feb. 14, 2013, for U.S. Appl. No. 12/242,772, filed Sep. 30, 2008, 32 pages.
Final Office Action mailed Feb. 4, 2016, for U.S. Appl. No. 14/535,101, filed Nov. 6, 2014, seven pages.
Gfroerer, T.H. (2000). "Photoluminescence in Analysis of Surfaces and Interfaces," in *Encyclopedia of Analytical Chemistry*, DD. 1-23, Copyright John Wiley & Sons Ltd, Chichester, pp. 9209-9231.
Manufacturers Listing. (Dec. 1995). *Laser Focus World, Buyers Guide* '96, 31(12), 151 pages.
Mattel. (2002). "System Service and Troubleshooting Manual descriptions," *Mattel Electronics Intellivision Intelligent Television*, located at www.dsplib.com/i ntv . . . , last visited Dec. 11, 2002, one page.
Non-Final Office Action mailed Oct. 11, 2012, for U.S. Appl. No. 12/242,772, filed Sep. 30, 2008, 28 pages.
Synaptics Touch Pad Interfacing Guide, Second Edition, Mar. 25, 1998, Synaptics, Inc., San Jose, CA, pp. 1-90.

\* cited by examiner

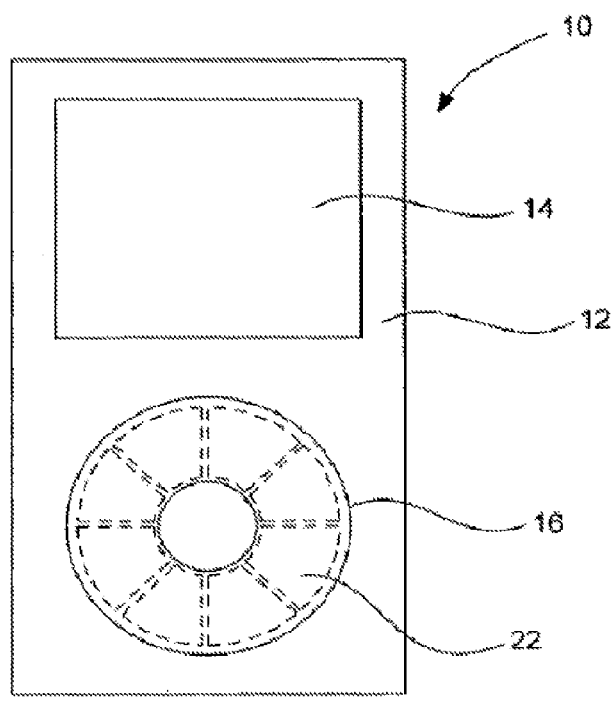
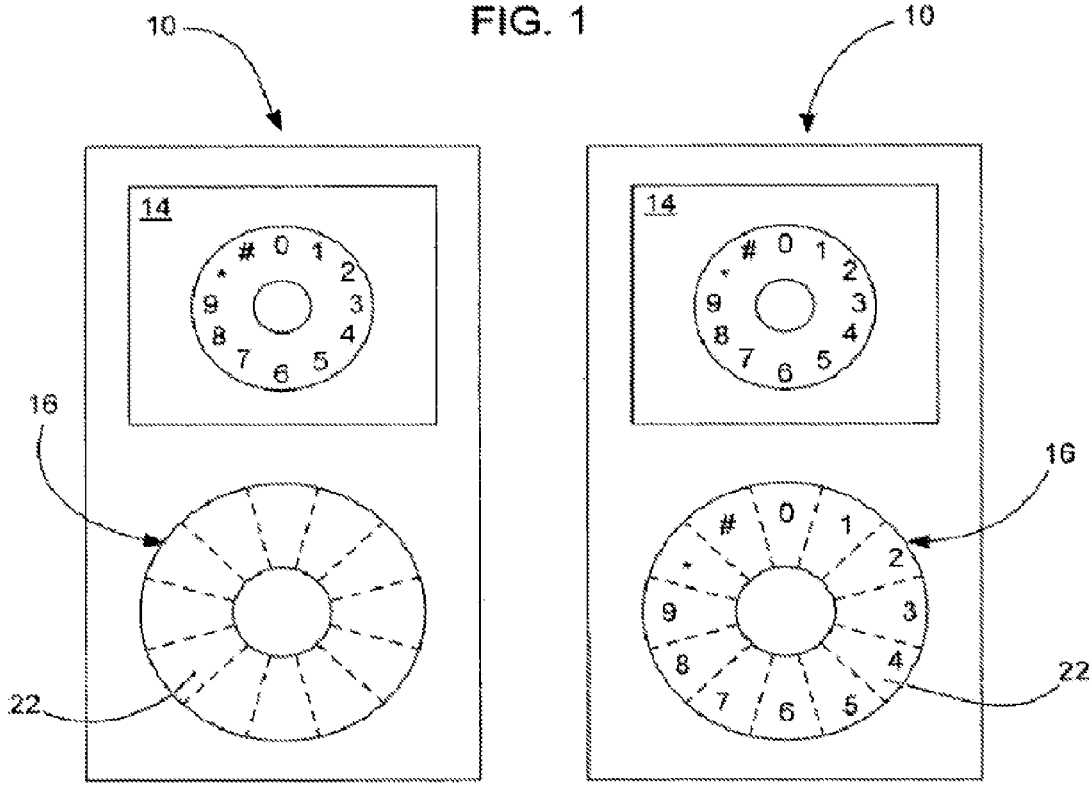

TRANSMIT →

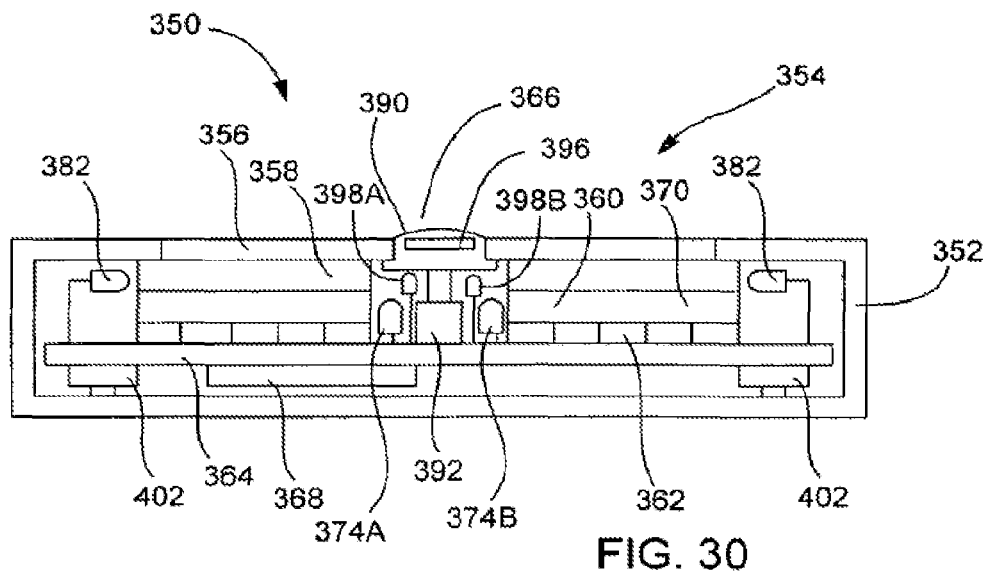
FIG. 30
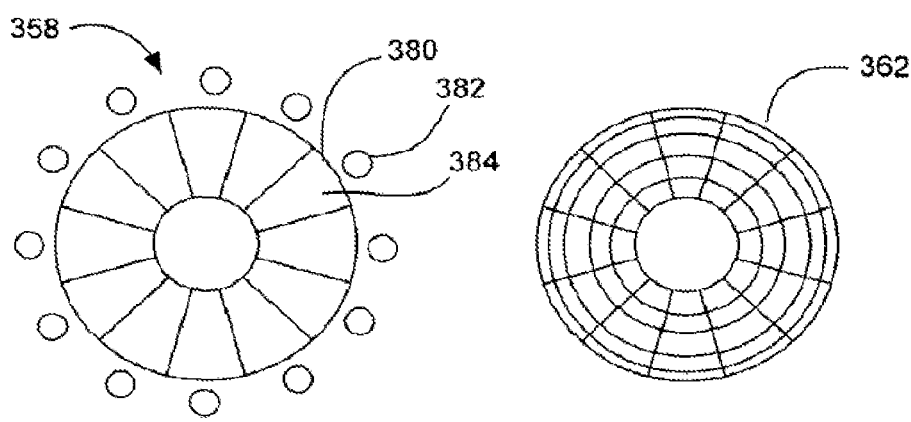
FIG. 31
FIG. 32
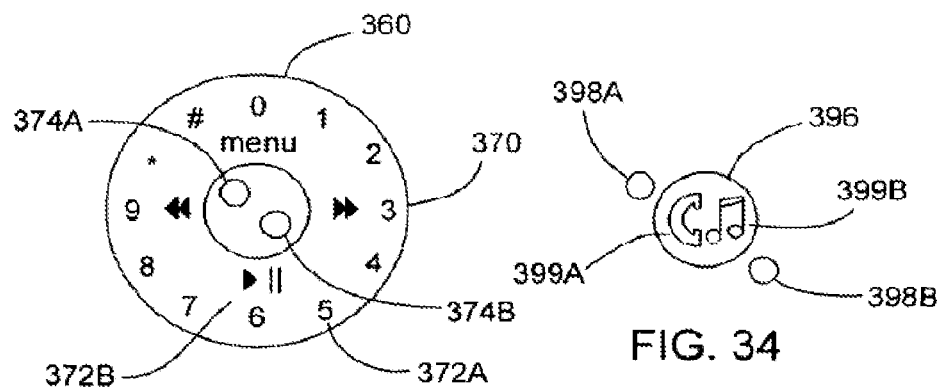
FIG. 33
FIG. 34

TOUCH PAD WITH SYMBOLS BASED ON MODE

CROSS REFERENCE TO RELATED APPLICATIONS

This application is a continuation of U.S. patent application Ser. No. 11/591,752, filed Nov. 1, 2006, which claims priority to Provisional Patent Application No. 60/755,656 entitled "TOUCH PAD WITH FEEDBACK" filed Dec. 30, 2005 which is herein incorporated by reference.

This application is related to the following applications, all of which are herein incorporated by reference:

U.S. patent application Ser. No. 10/188,185, titled "TOUCH PAD FOR HANDHELD DEVICE", filed Jul. 1, 2002;

U.S. patent application Ser. No. 10/722,948, titled "TOUCH PAD FOR HANDHELD DEVICE", filed Nov. 25, 2003;

U.S. patent application Ser. No. 10/643,256, titled "MOVABLE TOUCH PAD WITH ADDED FUNCTIONALITY", filed Aug. 18, 2003;

U.S. patent application Ser. No. 11/057,050, titled "DISPLAY ACTUATOR", filed Feb. 11, 2005;

U.S. patent application Ser. No. 10/840,862, titled "MULTIPOINT TOUCH SCREEN", filed May 6, 2004;

U.S. Patent Application No. 60/658,777, titled "MULTI-FUNCTIONAL HAND HELD DEVICE", filed Mar. 4, 2005;

U.S. patent application Ser. No. 11/115,539, titled "HANDHELD ELECTRONIC DEVICE WITH MULTIPLE TOUCH SENSING DEVICES", filed Apr. 26, 2005;

U.S. patent application Ser. No. 11/394,493, TITLED "ILLUMINATE TOUCHPAD", filed Mar. 31, 2006.

U.S. patent application Ser. No. 11/483,008, titled "CAPACITANCE SENSING ELECTRODE WITH INTEGRATED I/O MECHANISM", filed Jul. 6, 2006.

U.S. patent application Ser. No. 11/482,286, titled "MUTUAL CAPACITANCE TOUCH SENSING DEVICE", filed Jul. 6, 2006.

BACKGROUND OF THE INVENTION

1. Field of the Invention

The present invention relates generally to touch pads that provide visual feedback. More particularly, the present invention relates to touch pads with symbols that adapt based on mode.

2. Description of the Related Art

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like.

Touch pads, in particular, are becoming increasingly popular because of their ease and versatility of operation as well as to their declining price. Touch pads allow a user to make selections and move a cursor by simply touching an input surface via a finger or stylus. In general, the touch pad recognizes the touch and position of the touch on the input surface and the computer system interprets the touch and thereafter performs an action based on the touch event.

Touch pads typically include an opaque touch panel, a controller and a software driver. The touch panel registers touch events and sends these signals to the controller. The controller processes these signals and sends the data to the computer system. The software driver translates the touch events into computer events.

Although touch pads work well, improvements to their form feel and functionality are desired. By way of example; it may be desirable to provide visual stimuli at the touch pad so that a user can better operate the touch pad. For example, the visual stimuli may be used (among others) to alert a user when the touch pad is registering a touch, alert a user where the touch is occurring on the touch pad, provide feedback related to the touch event, indicate the state of the touch pad, and/or the like.

SUMMARY OF THE INVENTION

The invention relates, in one embodiment, to a multifunctional handheld device capable of operating in different modes. The multifunctional handheld device includes a single input arrangement that provides inputs for each mode of the multifunctional handheld device. The single input arrangement includes at least an input pad that provides signals when touched or pressed. The input pad can be divided into one or more input areas that change in accordance with the current mode of the multifunctional handheld device. The multifunctional handheld device also includes a display mechanism that presents graphical elements to indicate the configuration of the input areas at the input pad. Each mode of the multifunctional handheld device provides a different configuration of input areas and graphical elements associated therewith.

The invention relates, in another embodiment, to a multifunctional handheld computing device capable of operating in different modes. The multifunctional computing device includes a touch device having a touch surface (e.g., touch pad). The multifunctional computing device also includes a means for presenting input identifiers that indicate the locations of the touch surface designated for actuating inputs associated with the input identifiers. The multifunctional computing device further includes a means for indicating which input area is ready for actuation.

The invention relates, in another embodiment, to a touch pad that displays graphical elements to indicate input areas of the touch pad. Each input area represents a different functionality. The input areas and graphical elements changing in accordance with different input modes.

The invention relates, in another embodiment, to a touch pad. The touch pad includes a touch sensing layer. The touch pad also includes a first set of symbols that only illuminate with a first light. The touch pad further includes a second set of symbols that only illuminate with a second light. The touch pad additionally includes a light system capable of generating the first and second light.

The invention relates, in another embodiment, to a circular touch pad. The circular touch pad includes a circular light diffusing cover. The circular touch pad also includes a circular transparent touch sensing layer disposed below the light diffusing cover. The circular touch pad further includes a circular organic light emitting device (OLED) disposed below the transparent touch sensing layer. The circular touch pad additionally includes a printed circuit board disposed below the organic light emitting device (OLED). The printed circuit board carries a controller that is operatively coupled to the transparent touch sensing layer and the organic light emitting device. The controller receives touch data from the transparent touch sensing layer and instructs the organic light emitting device (OLED) how to present graphical information.

The invention relates, in another embodiment, to a method of operating a multifunctional hand held electronic device having a touch surface. The method includes displaying symbols in a circular fashion. Each symbol represents a different input to be made in the hand held electronic device. The method also includes mapping individual symbols being displayed to individual regions of the touch surface. The method further includes detecting a touch on the touch surface. The method additionally includes determining the region of the touch surface being touched. Moreover, the method includes highlighting only the symbol associated with the region of the touch surface being touched. The method also includes detecting a selection event and implementing the input associated with the symbol being highlighted when the selection event is initiated.

The invention relates, in another embodiment, to a method of operating a handheld electronic device having a touch device. The method includes designating input regions within a touch surface of the touch device. Each input region represents a different location within the touch surface. The method also includes assigning symbols to the input regions. The symbols characterize the functionality of the input regions. The method further includes displaying the symbols associated with the input regions, the location of the symbols indicating the location of the input area within the touch surface.

BRIEF DESCRIPTION OF THE DRAWINGS

The invention may best be understood by reference to the following description taken in conjunction with the accompanying drawings in which:

FIG. 1 is a simplified diagram of a multifunctional hand held device, in accordance with one embodiment of the present invention.

FIG. 2 is a diagram of a phone mode user interface, in accordance with one embodiment of the present invention.

FIG. 3 is a diagram of a phone mode user interface, in accordance with one embodiment of the present invention.

FIG. 30 is a diagram of a touch pad assembly, in accordance with one embodiment of the present invention.

FIG. 31 is a diagram of a touch pad assembly, in accordance with one embodiment of the present invention.

FIG. 32 is a diagram of a touch pad assembly, in accordance with one embodiment of the present invention.

FIG. 33 is a diagram of a touch pad assembly, in accordance with one embodiment of the present invention.

FIG. 34 is a diagram of a touch pad assembly, in accordance with one embodiment of the present invention.

DETAILED DESCRIPTION OF THE INVENTION

Figure 4:
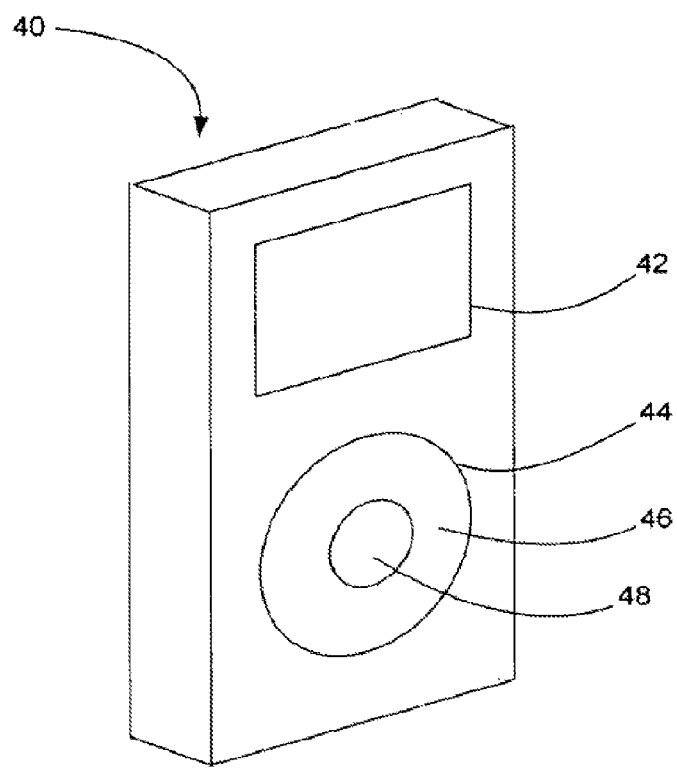
FIG. 4 is a perspective diagram of a multifunctional handheld device, in accordance with one embodiment of the present invention.

Recently, the functionality of individual hand held devices has been converging into a single hand held device with multiple functionality. For example, music player functionality has been added to cell phones and PDAs. While combining devices has advantages, it does create some design challenges. For one, each of these devices requires a different set of input devices, and thus it becomes a non trivial problem to create an input layout that can support multifunctional devices (especially when the input devices are at fixed locations). Examples of multifunctional devices may be found in U.S. Provisional Patent Application 60/658,777, which is herein incorporated by reference.

The invention pertains to a user interface for controlling an electronic device, particularly a multifunctional electronic device that is capable of operating in multiple modes as for example a phone mode for communications and a media player mode for playing audio files, video files, and the like.

In accordance with one aspect of the invention, the user interface includes a configurable input region for navigating, making selections and initiating commands with respect to the electronic device. The input region is configured to adjust its input areas based on mode so that the inputs being provided match the current mode of the electronic device. The input region may be widely varied and may include a touch or proximity sensing area that generates signals for one or more of the operations mentioned above when an object is positioned over a sensing surface. The sensing area is typically mapped according to mode of the electronic device.

In accordance with another aspect of the invention, the user interface also includes a display mechanism for presenting input identifiers that indicate particular locations of the input region capable of actuating inputs associated with the input identifiers. Generally speaking, the display mechanism is utilized in order to replace fixed printed graphics or indicia on or near the input region and to allow the graphical information to change or adjust in accordance with a current input mode (e.g., the graphics or indicia can be reconfigured on the fly). As such, a single input region can also be used to provide feedback associated with inputting. For example, it may be used to indicate which input area is ready for actuation (e.g., highlight).

In one embodiment, the display mechanism is configured to present graphical information proximate the input region so that it can be seen when inputs are being performed at the input region. For example, the display mechanism may be located above, below or next to the input region. In another embodiment, the display mechanism is configured to present graphical information at the input region. For example, the display mechanism may be integrated with a sensing surface of the input region. In either case, the graphics or indicia typically follows or is mapped to the desired input layout of the input region. For example, the adjustable graphics or indicia is located at the same position as their counterpart input areas of the input region. As such, physical fixed graphics and indicia can be removed from the input region without impairing the use of the input region (e.g., the user knows how to input based on the layout of the presented graphics and indicia).

Embodiments of the invention are discussed below with reference to FIG. 135. However, those skilled in the art will readily appreciate that the detailed description given herein with respect to these figures is for explanatory purposes as the invention extends beyond these limited embodiments.

FIG. 1 is a simplified diagram of a multifunctional hand held device 10, in accordance with one embodiment of the present invention. The multifunctional device is capable of operating in different modes including for example a phone mode and a media player mode (e.g., audio, video, etc.). By way of example, in the phone mode, the handheld device operates like a phone. For example, a user is able to dial a phone number, receive and send phone calls, etc. In the media player mode, the handheld device operates like a media player. For example, a user is able to traverse through lists of songs or videos, select and play a song or video from the lists of songs, and videos, etc.

In accordance with one embodiment, the multifunctional device 10 includes a single user interface 12 generally includes a display region 14 and an input region 16. The location of these regions may be widely varied. In one embodiment, the display region and input region are disposed at the front surface of the multifunctional device for easy access and viewing while the device is being held in the user's hand.

The display region 14 allows the handheld electronic device 10 to interact with the user. For example, displaying a graphical user interface GUI associated with each mode. The GUI provides an easy to use interface between a user of the handheld device and the operating system or applications running thereon. Generally speaking, the GUI represents, programs, files and various selectable options with graphical images. The GUI can additionally or alternatively display information, such as non interactive text and graphics, for the user of the handheld electronic device. The display may also be used to display images or play video.

The input region 16 allows a user to interact with the hand held electronic device 10. For example, it allows a user to navigate, make selections and initiate commands into the handheld electronic device 10. In most cases, the input region 16 may be simplified so as not to clutter and confuse the user interface. For example, the input region 16 may not be complexly arranged and may include a limited number of individualized input mechanisms. In one implementation, the input region is a single integrated unit for performing a majority if not all of the inputting of the handheld electronic device (e.g., operates each mode).

In most cases, the input region 16 provides signals when touched and/or pressed. The signals generated at the input region 16 are configured to provide one or more control functions for controlling various applications associated with the hand held device 10. For example, the control functions may be used to move an object on the display, to make selections or issue commands associated with operating the various modes of the handheld device 10.

The shape of the input region 16 may be widely varied. By way of example, and not by way of limitation, the input pad 18 may have a substantially rectangular, triangular, circular, square, oval, plus, and/or pill shape (among others). In the that circular input regions are easier to manipulate when operating handheld devices.

In accordance with one embodiment, the input region 16 is configurable based on mode. In this embodiment, the input region 16 is divided into one or more input areas 22 that change in accordance with the current mode of the handheld device 10. For example, each mode may divide the input region 16 into different input areas 22 and assign different functions thereto (e.g., each input area has a different task associated therewith based on mode).

The layout including shape and position of the input areas 22 within the input region 16 may be widely varied. The layout typically depends on the needs of each mode and the shape of the input region 16. By way of example, and not by way of limitation, the input areas 22 may have a substantially rectangular, triangular, circular, square, oval, plus, L, and/or pill shape (among others).

In the illustrated embodiment, the circular input region 16 is divided into angularly segmented input areas 22 with each segmented area 22 representing a different function. By way of example; in. the case of a phone mode, the circular input region 16 may be divided into angularly segmented input areas 22 with each segmented area 22 representing a different key. For example, the input region 16 may include twelve individual areas 22 associated with 0-9, * and #. In the case of a media player mode, the circular input region may be divided into angularly segmented areas 22 with each segmented region 22 representing a different playback control. By way of example, the input region 16 may include four individual input areas 22 associated with standard music playback including menu, play/pause, seek forward, and seek back. The input region 16 may further include a central input area 22 contained within the outer segmented input areas 22.

It should be appreciated, that the invention is not limited to circular shapes and layouts thereof. For example, a substantially rectangular input region with substantially rectangular, square or L shaped input areas may be used. Furthermore, the circular input region may be divided into radially segmented input areas solely or in addition to the angularly segmented input areas.

The UI configuration described above can be widely varied. In one embodiment, the UI is embodied with a fullscreen display and a touch screen disposed over all or a portion of the fullscreen display. In this embodiment, the display region and input regions are a graphical elements being displayed within the fullscreen display. The touchscreen, which covers at least the graphical elements of the input region, provides the means for inputting when a places their finger over the input region (e.g., virtual input region). This arrangement may be further embodied as display actuator that includes a movable component for initiating button signals. Examples of touchscreens may be found in U.S. patent application Ser. No. 10/840,862, and which is herein incorporated by reference.

In another embodiment, the UI is embodied with a physical display and a physical input pad that can be divided input various input areas based on mode. In this embodiment, the display defines the display region, and the input pad defines at least a portion if not all of the input region. The input pad may for example be a touch device that provides one or more touch signals when touched, a clickable or actuatable pad that provides one or more button signals when moved (e.g., pressed), or a clickable or actuatable touch device that provides one or more button signals when moved (e.g., pressed) and one or more touch signals when touched.

One or more touch or clickable buttons that provide button signals when touched or pressed may also be provided with the input pad. Although distinct from the input pad, the buttons may be integrated with the input pad. Furthermore, the buttons may be disposed outside the input pad, surround the input pad, and/or be disposed within the input pad. In one example, the central input area is embodied as a single central clickable button that is integrated with and disposed in the middle of the input pad. The buttons may also have assignable functions based on mode.

In one implementation, the input pad is a touch pad built into the housing of the hand held device. A touch pad is a touch sensing device with an extended continuous touch sensing surface. The touch pad may be rigid or fixed or it may be a movable actuator that provides button or clicking actions (e.g., a clickable or actuatable touch pad). Examples of touch pads may be found in U.S. Patent incorporated by reference.

In another implementation, the input pad is not a touch pad but rather a touch sensitive portion of a housing of the hand held device. A touch sensitive housing is a housing that includes touch sensing components integrated therewith (rather than a touch pad which is built into the housing). Examples of touch sensitive housing may be found in U.S. patent application Ser. No. 11/115,539, which are herein incorporated by reference.

In another implementation, the input pad is a movable or clickable actuator that is built into the housing of the handheld device. The movable or clickable actuator typically moves to a plurality of different positions to create button signals. This arrangement may be referred to as a navigation pad. Each position can be assigned a different function based on mode.

In any of the embodiments described above, the display may be selected from flat panel devices although this is not a requirement and other types of displays may be utilized. Flat panel devices typically provide a planar platform that is suitable for hand-held devices. By way of example, the display may correspond to a liquid crystal display (LCD) such as a character LCD that is capable of presenting text and symbols or a graphical LCD that is capable of presenting images, video, and graphical user interfaces (GUI). Alternatively, the display may correspond to a display based on organic light emitting diodes (OLED), or a display that is based on electronic inks.

Because the input region 16 is used over multiple platforms (e.g., modes), the device further includes a means for displaying or presenting information indicative of how the input region 16 is to be used or set up in each mode as well as to provide feedback when inputs are made. The information may be in the form of symbols including for example icons and/or characters such as letters and numbers.

In one embodiment, the display region 14 used to present this information. In this embodiment, the display region 14 displays graphical element that indicate functions which can be implemented with the input region. The graphical elements may be in the form of symbols including for example icons and/or characters such as letters and numbers. In most cases, the graphical elements are laid similarly to the various areas of the input region 16 so that a user knows the meaning of the input areas. That is, each graphical element is arranged in the same position as their counterpart input areas in the input region 16. By way of example, in the case of a circular touch sensing area 18 that is divided into angularly segmented regions, the graphical elements may be arranged in a circular manner with each circularly positioned graphical element located at the angular position of the angular segmented region they represent. Furthermore, if a button area 20 is disposed in the center of the touch sensing area 18, then an additional graphical element representative of the button area 18 may be displayed in the center of the circularly oriented graphical elements. Generally speaking, there is a one to one relationship between the graphical element and the region they represent.

Using a phone mode as an example, and referring to FIG. 2, the display 14 may present a circularly oriented number layout including for example 0-9, * and # positioned in a clock-like manner (e.g., 0 is located at 12 oclock, 1 is located at 1 oclock, 2 is located at 2 oclock, 3 is located at 3 oclock, 4 is located at 4 oclock, 5 is located at 5 oclock, 6 is located at 6 oclock, 7 is located at 7 oclock, 8 is located at 8 oclock, 9 is located at 9 oclock, * is located at 10 oclock, and # is located at 11 oclock). Furthermore, the input region 16, particularly the touch sensing area 18 may be segmented into twelve regions 22, each of which corresponds to the similarly positioned number in the circularly oriented number layout. As such, the user knows what regions to press for what number by looking at the display 14 and touching the appropriate area of the touch sensing area 18.

In another embodiment, the input region 16 is used to present this information. In this embodiment, the input region 16 displays graphical elements that indicate functions which can be implemented with each region 22. Like above, the graphical elements may be in the form of symbols including for example icons and/or characters such as letters and numbers. In most cases, the graphical elements are positioned within or at the appropriate input region 22 so that a user knows the meaning of the input region 22. By way of example, in the case of a circular touch sensing area that is divided into angularly segmented regions 22, individual graphical elements may be positioned in the angular segmented region they represent. Furthermore, if a button area 20 is disposed in the center of the touch sensing area 18, then an additional graphical element representative of the button area 20 may be displayed in the center of the button area. Generally speaking, there is a one to one relationship between the graphical element and the region they represent.

Using a phone mode as an example, and referring to FIG. 3, the input region 16 may present a circularly oriented number layout including for example 0-9, * and # positioned in a clocklike manner (e.g., 0 is located at 12 oclock, 1 is located at 1 oclock, 2 is located at 2 oclock, 3 is located at 3 oclock, 4 is located at 4 oclock, 5 is located at 5 oclock, 6 is located at 6 oclock, 7 is located at 7 oclock, 8 is located at 8 oclock, 9 is located at 9 oclock, * is located at 10 oclock, and # is located at 11 oclock). Furthermore, the input region 16, particularly the touch sensing area 18 may be segmented into twelve regions 22, each of which corresponds to the similarly positioned character in the circularly oriented number layout. As such, the user knows what regions to press for what number by looking at the input region 16 and touching the appropriate area of the touch sensing area 18.

FIG. 4 is a perspective diagram of a multifunctional handheld device 40, in accordance with one embodiment of the present invention. The multifunctional handheld device 40 is capable of being operated in various modes including for example a phone mode and a media player mode. By way of example, the multifunctional handheld device 40 may be a media player with added phone functionality. For example, the media player may be an iPod manufactured by Apple Computer Inc of Cupertino Calif., with additional components for operating the media player like a phone.

The multifunctional handheld device 40 includes a display 42 and further a configurable input arrangement 44 consisting of a clickable and circular touch pad 46 and a central clickable button 48. The display 42 and configurable input arrangement 44 are used for substantially all modes of the multifunctional device 40. The display 42 presents graphical elements including a graphical user interface for each mode of the device 40. The configurable input arrangement 44 provides inputs for each mode of the device 40. Particularly, the touch pad 46 provides position signals when touched, and one or more button signals when pressed. The button 48 also provides a button signal when pressed. The signals generated by the various device can be used to drive the modes in different ways.

In accordance with one embodiment, the configurable input arrangement changes its inputting including layout and functionality based on the current mode of the device. When a phone mode is active, for example, the configurable input arrangement is configured for phone inputting. By way of example, the touch pad may be divided into angular input areas that represent the keys of a phone. When a media player mode is active, on the other hand, the configurable input arrangement is configured for navigating and playing media. By way of example, the touch pad may be divided into angular input areas that represent various playback controls (e.g., menu, next, previous, and play/pause). In addition, the central clickable button may be used for making selections in both modes.

In accordance with another embodiment, the handheld device also includes a means for presenting input identifiers that indicate the locations and functionality of input areas of the touch pad. In one implementation, the input identifiers are presented on the display. Additionally or alternatively, the input identifiers may be presented at the surface of the touch pad and possibly the clickable button. Additionally or alternatively, the input identifiers may be presented at the surface of the housing around the touch pad. In all of these cases, the input identifiers are positioned in a circular fashion similarly to the input areas. The handheld device may further include a means for indicating which input area is ready for actuation/selection (e.g., highlighting). This indication may also be provided by the display, a touch pad surface and/or a housing surface around the touch pad.

As mentioned before, it is generally believed that circular input devices are easier to manipulate when operating handheld devices. This is especially true for circular touch pads as shown in FIG. 4. For example, one advantage of a circular touch pad is that the touch sensing area can be continuously actuated by a simple swirling motion of a finger, i.e., the finger can be rotated through 360 degrees of rotation without stopping. Another advantage of a circular touch pad is that the user can rotate his or her finger tangentially from all sides thus giving it more range of finger positions. For example, a left handed user may choose to use one portion of the touch sensing area while a right handed user may choose to use another portion of the touch sensing area. Yet another advantage of a circular touch pad is that it allows an intuitive way to navigate a display screen. For example, in the case of scrolling, the user can manipulate the his or her finger side to side for horizontal scrolling and the user can manipulate his or her finger backwards and forwards for vertical scrolling.

Figure 5:
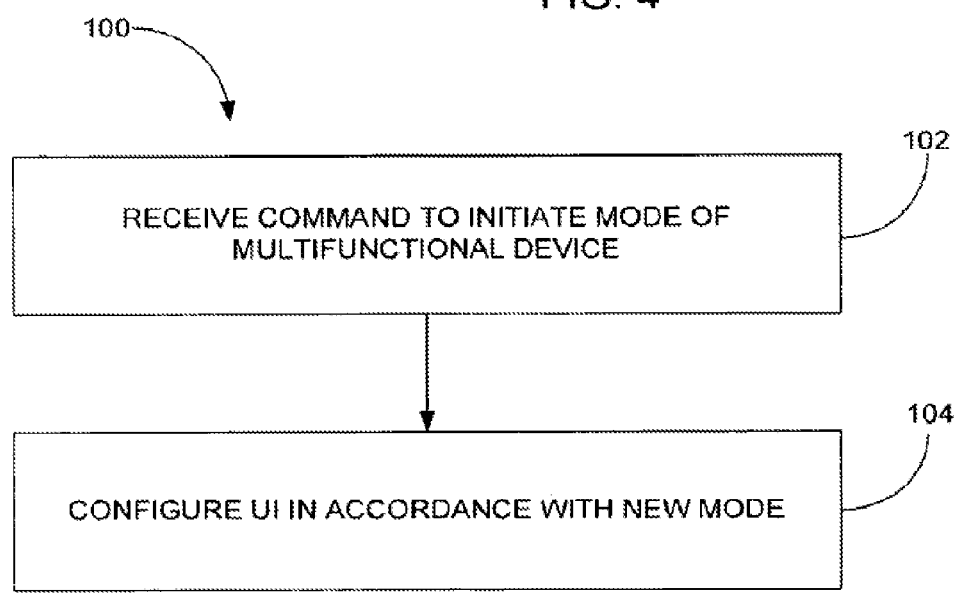
FIG. 5 is a method of operating a multifunctional device having a plurality of modes, in accordance with one embodiment of the present invention.

FIG. 5 is a method 100 of operating a multifunctional device having a plurality of modes, in accordance with one embodiment of the present invention. The method 100 begins at block 102 where a command is received to initiate a mode of the multifunctional device. The command can be generated by the device itself as for example at start up or by the user when they desire to change modes from one mode to another. In the case of start up, either the current mode at shut down or some default mode or a user preference start up mode is initiated. In the case of a user, the mode selected by the user is initiated.

Once a command is initiated, the method 100 proceeds to block 104 where the UI is configured in accordance with the new mode. For example, the current UI associated with the current mode is deactivated and the new UI associated with the new mode is activated. By way of example, switching from a phone mode to a music player mode may include removing the input symbol layout associated with the phone mode from the display and/or the touch pad and presenting a new input symbol layout associated with the music player on the display and/or the touch pad. Activation may further include reassigning the regions of the touch pad and the functionality associated therewith.

Figure 6:
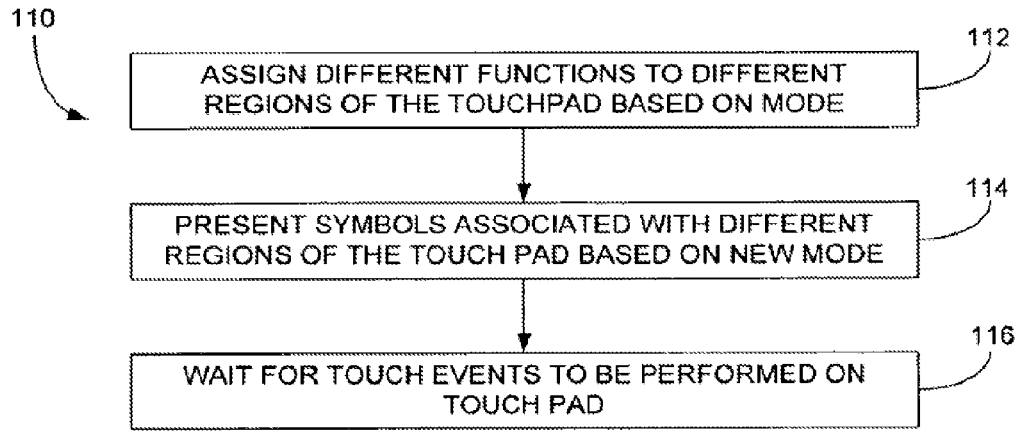
FIG. 6 is a method of configuring a UI of a hand held device, in accordance with one embodiment of the present invention.

FIG. 6 is a method 110 of configuring a UI of a hand held device, in accordance with one embodiment of the present invention. The method 110 includes block 112 where different functions are assigned to different regions of a touch pad based on the mode. In block 114, symbols associated with the different regions of the touch pad based on the new mode are presented. The symbols generally provide meaning to the regions. The symbols may for example be presented on the display and/or the touch pad. When presented on the display, the symbols are typically arranged similarly to the corresponding regions of the touch pad. When presented on the touch pad, the symbols are typically positioned at their corresponding region of the touch pad. The symbols may be presented with a transition effect such as fading in/out. In some cases, the new symbols fade in as the old symbols fade out. In block 116, the touch pad waits for touch events to be performed thereon.

Figure 7:
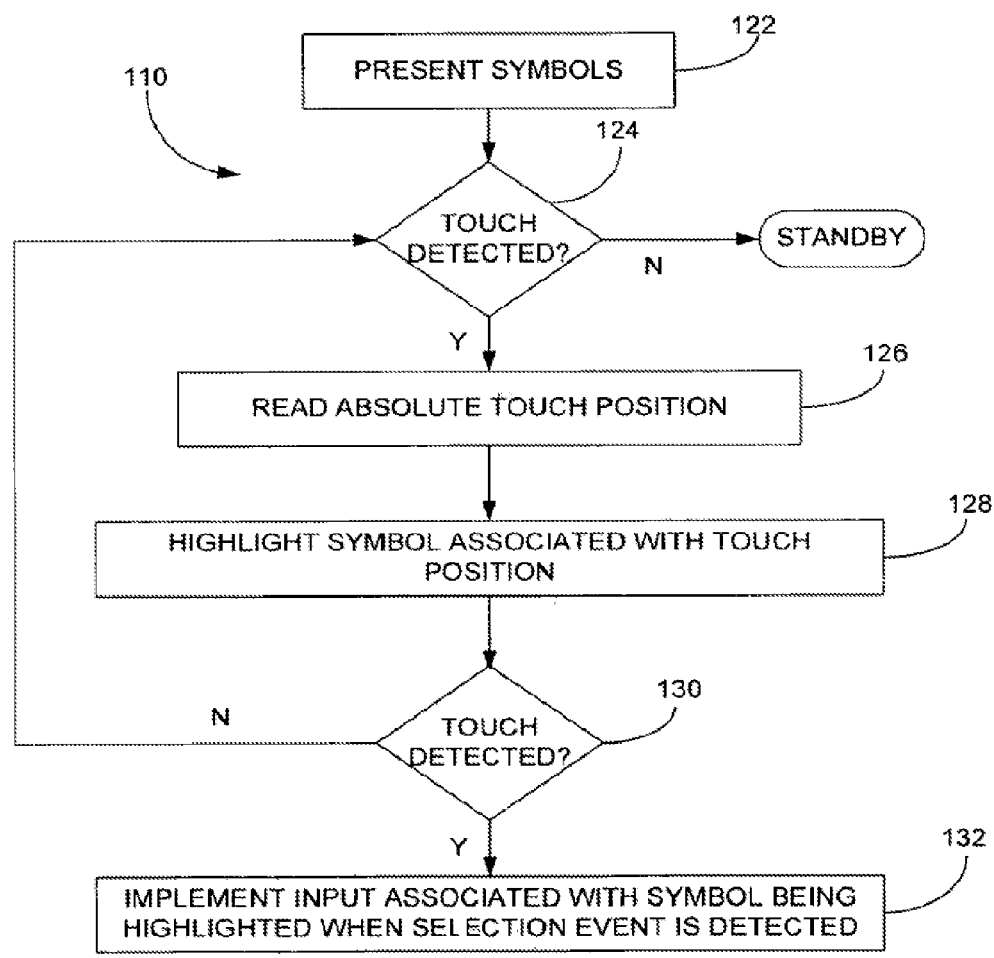
FIG. 7 is a method of activating a UI as for example at start up or when a mode is changed, in accordance with one embodiment of the present invention.

FIG. 7 is a method 120 of activating a UI as for example at start up or when a mode is changed. The method 120 begins at block 122 where symbols are presented. The symbols may be presented on a display and/or a touch pad. The symbols are typically tied to different regions or locations of the touch pad.

Thereafter, in block 124, a determination is made as to whether a touch is detected at the touch pad. If a touch is not detected, the method 120 waits for a touch or possible a new mode command.

If a touch is detected, the method 120 proceeds to block 126 where the absolute touch position associated with the touch is read from the touch pad. For example, the coordinates of the touch relative to the touch surface may be ascertained.

Thereafter, in block 128 the symbol associated with the touch position is highlighted. For example, the touch position may be mapped to a touch region, and the symbol associated with the touch region is highlighted.

Thereafter, in block 130, a determination is made as to whether or not a selection event has been performed. The determination may be based on the amount of pressure that is applied on the touch pad, i.e., whether or not the touch pad has been pressed (rather than just touched). This can be accomplished by analyzing the area of the touch (if the area of the touch increases then a press is being made). This can also be accomplished with actuators (sensors, switches) that sense pressure at the touch pad surface. In one implementation, the touch pad is a clickable touch pad that moves relative to a housing in order to provide a clicking action. When clicked, one or more tact switches are activated. An activated switch indicates a press and therefore a selection event.

Thereafter, in block 132, the input or function associated with the region where the symbol is highlighted when the selection event occurs is implemented. This may include referring to a table that maps a particular entry and symbol to a particular touch region, and thereafter entering and presenting the entry.

Figure 8A:
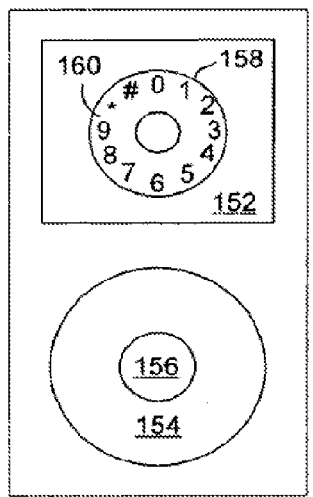
FIGS. 8A-8E illustrates one example of a handheld device with a keyless phone system, in accordance with one embodiment of the present invention.

FIGS. 8A-8E illustrates one example of a handheld device with a keyless phone system. The handheld device 150 includes a display 152 and a circular touch wheel 154 with a button 156 disposed in the center. As shown in FIG. 8A, when placed in a phone mode, the display 152 is configured to present a virtual wheel 158 with phone characters 160 such as numbers, * and # placed at locations around the wheel 158. The locations of the characters 160 correspond to regions of the touch wheel 154 that may be touched in order to enter the character.

Figure 8B:
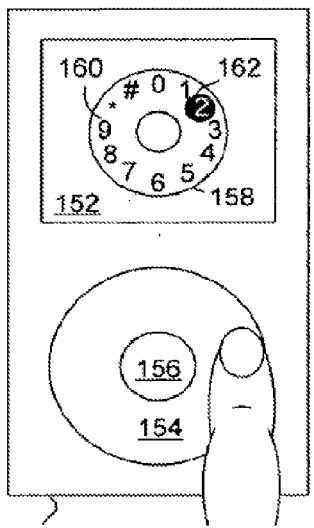

As shown in FIG. 8B, when a touch is detected at the touch wheel 154, the character 160 assigned to the region of the touch wheel 154 where the touch is detected is highlighted. For example, if the user touches the touch wheel at 2 oclock, the character 2 is highlighted. In the illustrated embodiment, the character 160 is highlighted with a circle member 162. In one implementation, the circle member 162 is black and when highlighted by the black circle member 162 the character 160 is turned to white. In another implementation, the circle member 162 is a semi transparent overlay.

Figure 8C:
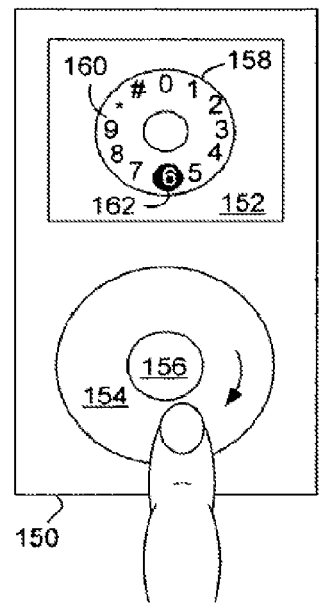

As shown in FIG. 8C, when the finger is moved to a new region of the touch wheel 154, a new character 160 is highlighted based on the new location of the touch. In cases where the finger stays in contact with the touch pad (sliding across), each character 160 between the starting position and the ending position is consecutively highlighted as the finger is moved over the various regions. The user therefore knows what region of the touch pad they are positioned on. In cases where the finger is picked up and moved to a new locations, only the new touch location is highlighted.

Figure 8D:
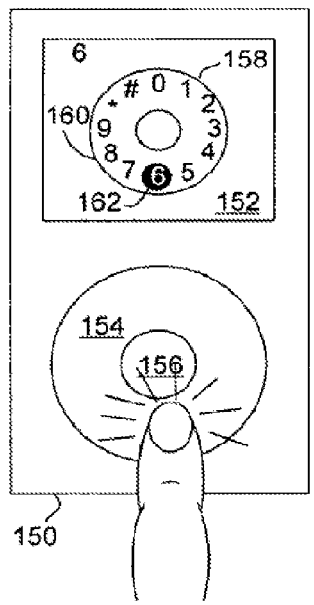

As shown in FIG. 8D, when a finger performs a selection event as for example by clicking or tapping the touch wheel, the highlighted character 160 is entered into the system and presented on the display 152 along with the virtual wheel 158. For example, a portion of the display may be dedicated to number entries (e.g., above or below the virtual wheel). Utilizing the steps shown in FIGS. 8B-8D, any number of characters can be entered and presented on the display.

Figure 8E:
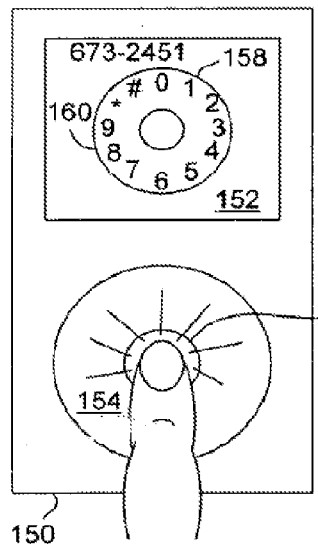

As shown in FIG. 8E, once the desired group of numbers/characters 168 have been entered, a send command may be performed. For example, the center button 156 can be activated in order to generate a send command. The send command informs the handheld device 150 to call/transmit the group of numbers that were entered.

In some cases, the display may further present letters associated with the numbers. This may follow the same circular pattern discussed above with the letters being displayed around the inner periphery and the numbers being display around the outer periphery. Alternatively, the display may include a letter region that displays the letters when the numbers are highlighted. This region may for example be found underneath the virtual wheel.

Figure 9A:
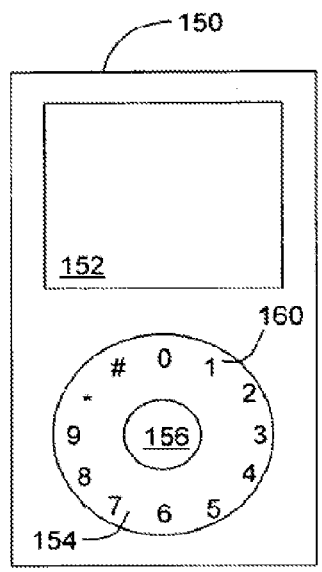
FIGS. 9A-9E illustrate one example of a handheld device with a keyless phone system, in accordance with one embodiment of the present invention.

FIGS. 9A-9E illustrate one example of a handheld device with a keyless phone system. The handheld device 150 includes a display 152 and a circular touch wheel 154 with a button 156 disposed in the center. As shown in FIG. 9A, when placed in a phone mode, the touch wheel 154 is configured to present phone characters 160 such as numbers, * and # at different angular locations around the wheel 154.

Figure 9B:
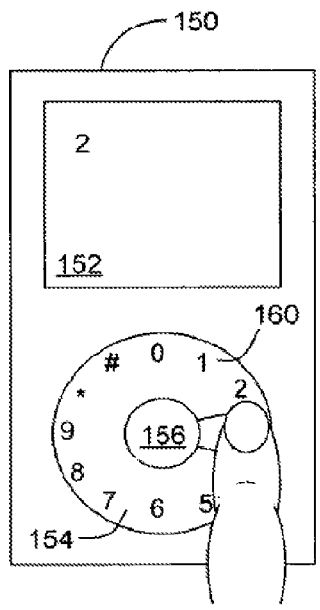

As shown in FIG. 9B, when a touch is detected at the touch wheel 154, the character 160 assigned to the region of the touch wheel 154 where the touch is detected is highlighted. In one implementation, the entire segmented region is highlighted. In another implementation, the segmented region is surrounded by a highlight line. Furthermore, the highlighted character 160 is presented on the display 152 in the area of the display 152 dedicated to number entries.

Figure 9C:
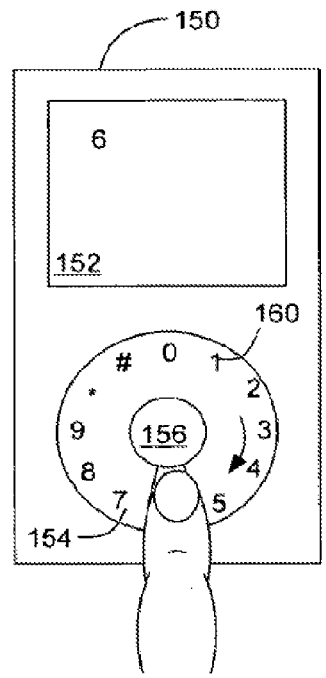

As shown in FIG. 9C, when the finger is moved to a new region of the touch wheel, a new character 160 is highlighted and presented on the display 152. In cases where the finger stays in contact with the touch wheel (sliding across), each consecutive character 160 between the starting position and the ending position is highlighted and presented on the display 152 as the finger is moved over the various regions. The user therefore knows what region of the touch wheel 154 they are positioned on.

Figure 9D:
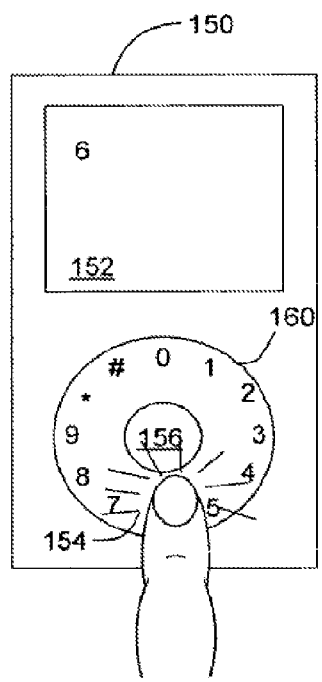

As shown in FIG. 9D, when a finger performs a selection event as for example by clicking or tapping the touch wheel, the highlighted character 160 is entered into the system. Utilizing the steps shown in FIGS. 9B-9D, any number of characters can be entered and presented on the display 152.

Figure 9E:
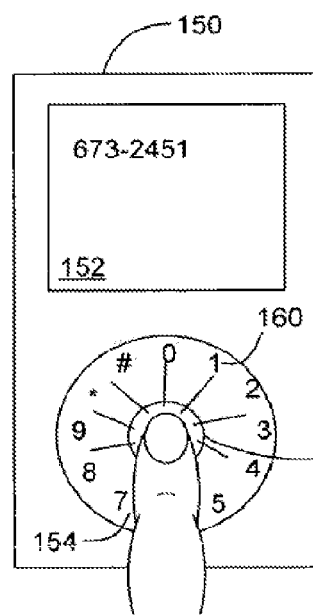

As shown in FIG. 9E, once the desired group of numbers/characters have been entered, a send command may be performed. For example, the center button can be activated in order to generate a send command. The send command informs the handheld device 150 to transmit the numbered that was entered.

Figure 10:
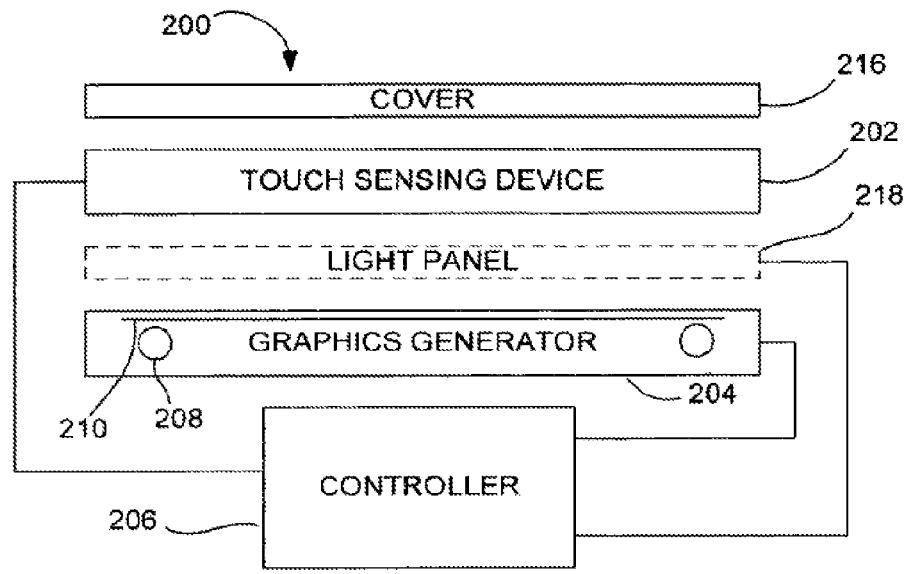
FIG. 10 is a simplified diagram of a touch pad, in accordance with one embodiment of the present invention.

FIG. 10 is a simplified diagram of a touch pad 200, in accordance with one embodiment of the present invention. In this embodiment, the touch pad 200 includes an optically transmissive touch sensing device 202 disposed over a graphics generator 204. Both the touch sensing device 202 and the graphics generator 204 communicate with a controller 206 that monitors touch inputs of the touch sensing device 202 and that directs the graphics generator 204 to generate graphics in a controlled manner.

The touch sensing device 202 may be widely varied. The touch sensing device 202 may for example be selected from any of those used for touch screens. An example of a touch screen that may be used can be found in U.S. patent application Ser. No. 10/840,862, which is herein incorporated by reference.

The graphics generator 204 may also be widely varied. In one embodiment, the graphics generator 204 includes one or more light sources 208 for generating light (visible and/or non visible) and one or more graphics layers 210 having features 212 for creating symbols such as characters from the generated light. The light sources 208 may be placed at a variety of locations depending on the configuration of the graphics layers 210. By way of example, the light sources 208 may be placed below, above and/or to the side of the graphics layers 210. Furthermore, light carriers such as light pipes and light distribution panels may be used to help distribute the light to the graphics layer 210. By way of example, a light distribution panel may help distribute light from side firing light sources 208 to the entire graphics layer 210. The light distribution panel can be disposed above, below and even in between various graphics layers.

The features 212, on the other hand, are typically configured in the desired symbol shape. The features 212 may include masking elements (e.g., openings in the layer) and/or light excitable elements (photo sensitive portions of the layer). In the case of masking elements, when a light source is turned on, light is emitted through the masking elements thereby making one or more symbols appear at the surface. In the case of light excitable elements, when a light source is turned on, the light is absorbed by the light excitable elements and reemitted thereby making one or more symbols appear at the surface. In most cases, the light excitable elements are configured to absorb non visible light and reemit visible light. In some cases, the light excitable elements may even be sensitive to a certain wavelength range (only absorb certain wavelengths of light). As such, different sets of features can be activated with different wavelength ranges. This is very beneficial when designing a touch pad to serve multiple modes of a hand held electronic device.

The touch pad 200 can also include a cover 216 for protecting the various layers. In some cases, the cover 216 may also act as a light diffuser for normalizing the intensity of light, and helping hide the various layers from view. By way of example, the cover may act as a canvas for the graphics generator (i.e., place where illuminated symbols are projected).

The touch pad 200 may further include a light panel 218 for producing other visual effects, either separately or together with the graphics generator 204. In one embodiment, the light panel 218 may be used to highlight the features 212 generated via the graphics generator 204. The light panel 218 may be placed above or below the graphics generator 204 (depending on the optical properties of the graphics generator).

Alternatively or additionally, the graphics generator 204 may be embodied as an OLED.

Figure 11:
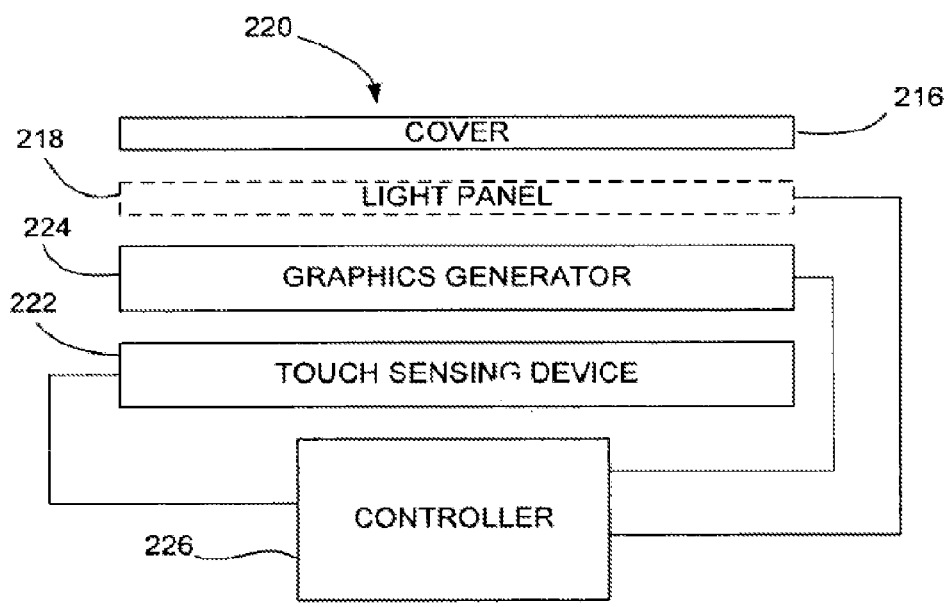
FIG. 11 is a simplified diagram of a touch pad, in accordance with one embodiment of the present invention.

FIG. 11 is a simplified diagram of a touch pad 220, in accordance with one embodiment of the present invention. In this embodiment, the touch pad 220 includes an opaque or alternatively an optically transmissive touch sensing device 222 disposed below a graphics generator 224. Both the touch sensing device 222 and the graphics generator 224 communicate with a controller 226 that monitors touch inputs of the touch sensing device 222 and that directs the graphics generator 224 to generate graphics in a controlled manner.

The touch sensing device 222 may be widely varied. The touch sensing device 222 may for example be selected from any of those used for touch pads or touch screens. An example of a touch pad that may be used can be found in U.S. patent application Ser. Nos. 10/188,182, 10/722,948, 10/643,256 and 11/483,008, all of which are herein incorporated by reference.

The graphics generator 224 may also be widely varied. Unlike the graphics generator discussed in FIG. 10, this graphics generator herein needs to allow touch sensing to occur therethrough. For example, it may be formed from a dielectric material so that touch sensing can occur with impediments (e.g., capacitance). In all other aspects it can be configured similarly to the graphics generator described above. For example, the graphics generator includes light sources and a graphics layer consisting of masking elements and/or light excitable elements.

Furthermore, like the touch pad mentioned above the touch pad can also include a cover for protecting the various layers and a light panel for producing other visual effects.

Figure 12:
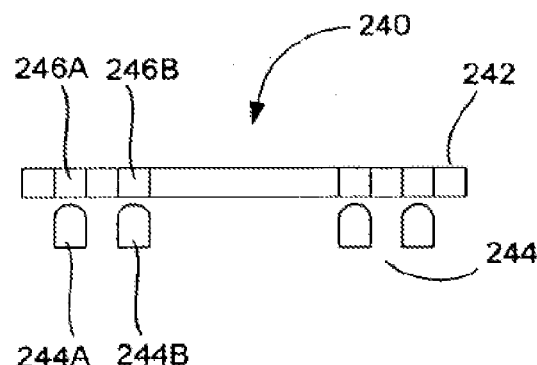
FIG. 12 is a diagram of a graphics generator, in accordance with one embodiment of the present invention.

FIG. 12 is a diagram of a graphics generator 240, in accordance with one embodiment of the present invention. The graphics generator 240 includes an opaque masking layer 242 and a light system 244. The masking layer 242 includes a plurality of openings 246 shaped as symbols. During operation, the light system 244 emits light below the masking layer 242. Light that intersects the masking layer 242 is blocked while light that intersects the openings 246 travels through the openings 246 to the other side thereby forming illuminated symbols.

In order to produce symbol layouts for different modes, the masking layer 242 may include different sets of openings 246A and 246B with each set having a dedicated light system 244A and 244B dedicated thereto. When the device is in a mode A, the light system 244A emits light below the masking layer 242, and more particularly directly behind the openings 246A such that illuminated symbols associated with mode A are formed. When the device is in mode B, the light system 244B emits light below the masking layer, 242 and more particularly directly behind the openings 246B such that illuminated symbols associated with mode B are formed.

FIGS. 13-20 are diagrams of graphics generators 250, in accordance with several embodiments of the present invention. The graphics generators 250 include one or more light systems 252, one or more light distribution panels 254, and one or more graphics layer 256 with light excitable elements 258 shaped as symbols. The light system 252 is configured to generate light, the light distribution panel 254, which is formed from an optically transmissive material (e.g., transparent) is configured to distribute the light to the graphics layers 256 with light excitable elements 258, and the light excitable elements 258 are configured to absorb and reemit the generated light. The light system 252 may be placed at various locations relative to the light excitable elements 258. For example, it may be placed above, below, and/or to the side. Furthermore, the light excitable elements 258 may be placed on the front and/or back or within the light distribution panel 254.

Figure 13:
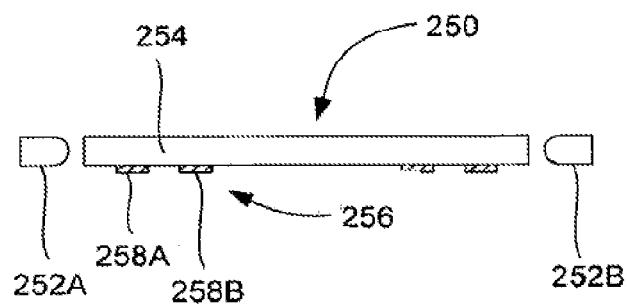
FIG. 13 is a diagram of a graphics generator, in accordance with one embodiment of the present invention.

As shown in FIG. 13, the light excitable elements 258 are placed on the front of the light distribution panel 254.

Figure 14:
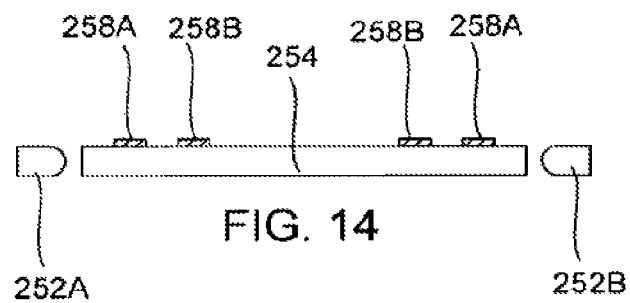
FIG. 14 is a diagram of a graphics generator, in accordance with one embodiment of the present invention.

As shown in FIG. 14, the light excitable elements 258 are placed on the back of the light distribution panel 254.

Figure 15:
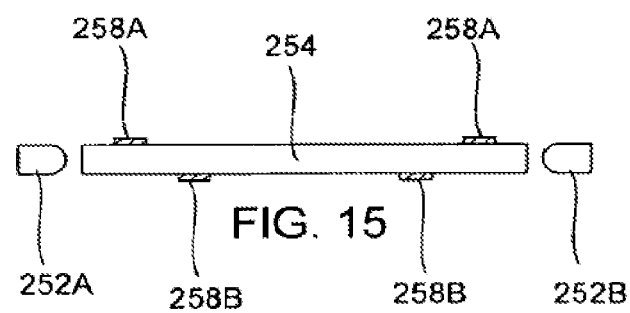
FIG. 15 is a diagram of a graphics generator, in accordance with one embodiment of the present invention.

As shown in FIG. 15, the: light excitable elements 258 are placed on both the front and the back of the light distribution panel 254.

Figure 16:
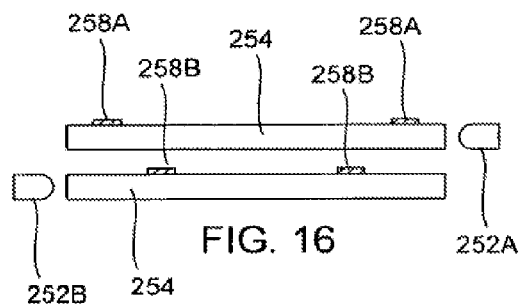
FIG. 16 is a diagram of a graphics generator, in accordance with one embodiment of the present invention.

Alternatively or additionally, as shown in FIG. 16, a portion of the light excitable elements 258 may be placed on a first light distribution panel 254A, and a second portion may be placed on a second light distribution panel 254B.

Figure 17:
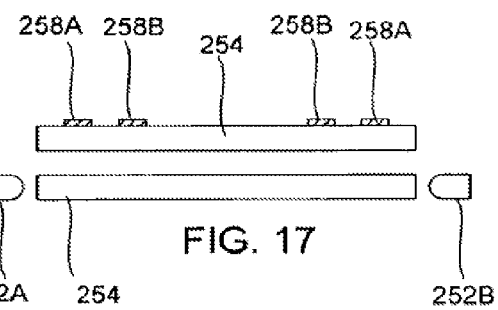
FIG. 17 is a diagram of a graphics generator, in accordance with one embodiment of the present invention.
Figure 18:
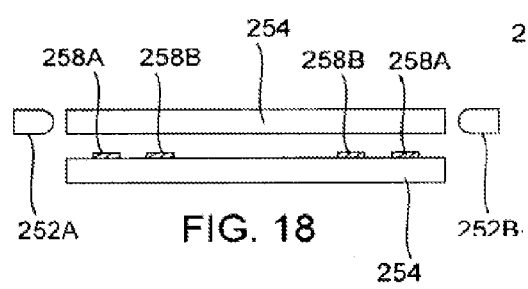
FIG. 18 is a diagram of a graphics generator, in accordance with one embodiment of the present invention.

Alternatively or additionally, as shown in FIGS. 17 and 18, the light excitable elements 258 may be placed on a separate carrier 255 disposed above or below the light distribution panel 254.

Figure 19:
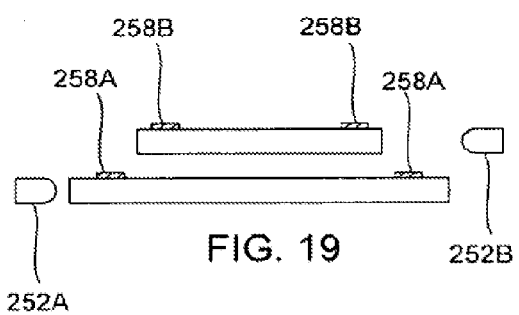
FIG. 19 is a diagram of a graphics generator, in accordance with one embodiment of the present invention.

Alternatively or additionally, as shown in FIG. 19, a first portion of the light excitable elements 258 may be placed on an smaller diameter light distribution panel 254, and a second portion of the light excitable elements 258 may be placed on larger diameter light distribution panel 254.

In one embodiment, which can be applied to the various embodiments described above, during operation, the light system 252 emits non visible light into the light distribution panel 254, and the light distribution panel 254 transmits the non visible light to the light excitable elements 258. The light excitable elements 258 then absorbs the non visible light directed thereon and reemits it as visible light thereby forming illuminated symbols.

In order to produce symbol layouts for different modes, the graphics layer 256 with light excitable elements 258 shaped as symbols may include different sets of light excitable elements 258A and 258B with each set having a dedicated light system 252A and 252B. In this embodiment, each set of light excitable elements 258 is excited with a different wavelength of light. When the device is in mode A, the light system 252A emits a first wavelength of light into the light distribution panel 254 thereby exciting the first set of light excitable elements 258A and not exciting the second set of light excitable elements 258B. When the device is in mode B, the light system 252B emits a first wavelength of light into the light distribution panel 254 thereby exciting the second set of light excitable elements 2588 and not exciting the first set of light excitable elements 258A: When excited, the first set of light excitable elements 258A creates illuminated symbols associated with mode A, and the second set of light excitable elements 2588 creates illuminated symbols associated with mode B.

Figure 20:
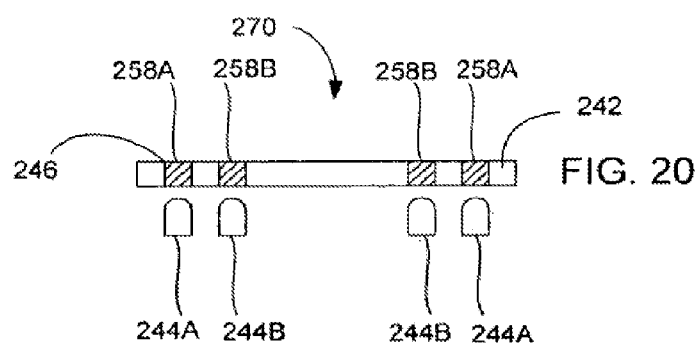
FIG. 20 is a diagram of a graphics generator, accordance with one embodiment of the present invention.

FIG. 20 is a diagram of a graphics generator 270, in accordance With another embodiment of the present invention. This embodiment of the graphics generator 270 combines the masking layer of FIG. 12 with light excitable elements of the other embodiments of FIGS. 13-18. That is, the light excitable elements 258 are placed in front of, within or behind the openings 246 of the masking layer 242. As such, when non visible (or visible) light is directed towards or through the opening 246, the light excitable elements 258 are excited (absorb and reemit) thereby forming illuminated symbols.

In all of the embodiments described above, the configuration of the light system 244, 252 may be widely varied. For example, they may be embodied as LEDs, light panels, etc. Furthermore, the light excitable elements 258 may be formed from any photoluminescence (PL) material. The material selected may depend on whether the graphics layer 256 is disposed above or below a touch sensing device. For example, in cases where it is disposed above a capacitive touch sensing layer, the PL material needs to be formed from a dielectric material.

The PL material may be widely varied. Generally a PL material is classified as a material that radiates visible light after being energized. In the embodiments described herein, the PL material is energized with visible or non visible light. By way of example, the PL material may contain phosphors that are energized with ultraviolet light of various wavelengths. The UV light may be produced by LEDs. LEDs offer many advantages.

In order to highlight the various symbols produced by the graphics generators, the graphics generators may include highlight features and symbol features on the same graphics layer. In this embodiment, each symbol includes its own highlight feature. Further, the symbol features typically operate with the same light system while each highlight feature typically operates with its own dedicated light system. During operation, all the symbol features are turned on when a mode is activated, and then when a touch is detected over a particular symbol, the highlight feature associated with that symbol is turned on. This is typically accomplished with a controller.

Additionally or alternatively, the graphics generators may include dedicated graphics layers, one or more for the symbol features and one or more for the highlight features.

Figure 22:
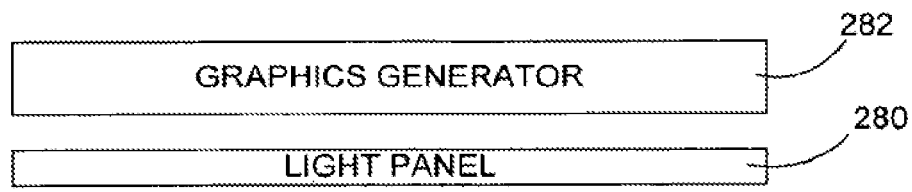
FIG. 22 is a diagram of a graphics generator including a light panel, in accordance with one embodiment of the present invention.
Figure 21:
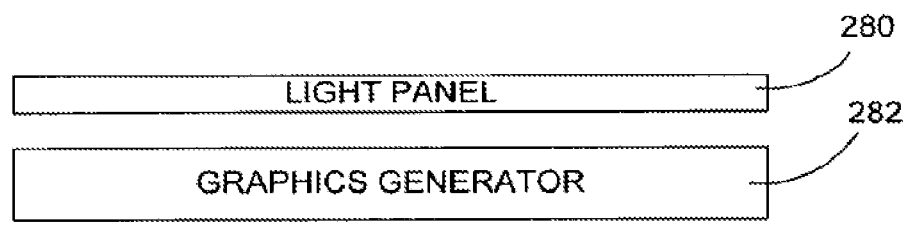
FIG. 21 is a diagram of a graphics generator including a light panel, in accordance with one embodiment of the present invention.
Figure 23:
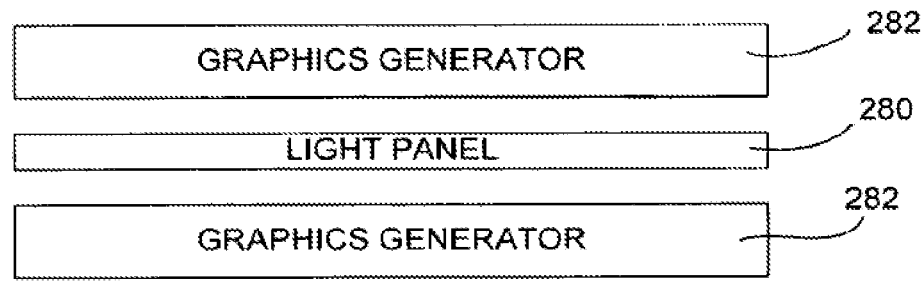
FIG. 23 is a diagram of a graphics generator including a light panel, in accordance with one embodiment of the present invention.

Additionally or alternatively, the graphics generators may include light panels for highlighting the symbol features. The light panel can be disposed above, below or in between the graphics layers. The light. Panels are configured to distribute light in a segmented manner. For example, the light panel can be configured with separately controlled light regions, each of which corresponds to a particular symbol feature. During operation, all the symbol features are turned on when a mode is activated, and then when a touch is detected over a particular symbol, the light region associated with that symbol is turned on. This is typically accomplished with a controller. FIGS. 21-23 show three simplified examples of this embodiment. In FIG. 21, a light panel 280 is disposed above a graphics generator 282. In FIG. 22, the light panel 280 is disposed below the graphics generator 282. In FIG. 23, the light panel 280 is disposed between two graphics generators 282. Although only these examples are shown, it should be appreciated that any number of configurations can be used to produce the desired effect. Furthermore, it should be pointed out that the light panel can be used for other visual effects (e.g., not limited to highlighting).

FIGS. 24-29 show several top views of graphical layers that can be used, in accordance with several embodiments of the present invention. In each of these embodiments, the touch pad in which the graphical layer is used has an annular and circular configuration. The area in the middle may for example be used for button inputting while the annular area may for example be used for touch inputting. Furthermore, in each of these embodiments, the graphical layer includes various symbols formed from masking elements and/or light excitable elements.

Figure 24:
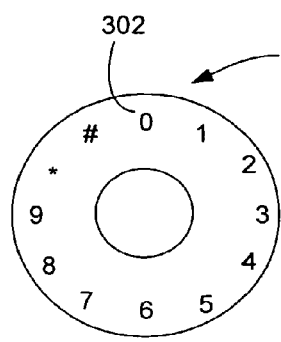
FIG. 24 is a graphical layer which can be used in a phone mode, in accordance with one embodiment of the present invention.

FIG. 24 is a graphical layer 300 which can be used in a phone mode. The graphical layer 300 includes the numbers and other characters 302 needed for phone inputting as for example 0-9, * and #. Each number is positioned in an angular manner around the touch pad. 0 is at 12 oclock, 1 is at 1 oclock, 2 is at 2 oclock, 3 is at 3 oclock, 4 is at 4 oclock, 5 is at 5 oclock, 6 is at 6 oclock, 7 is at 7 oclock, 8 is at 8 oclock, 9 is located at 9 oclock, * is at 10 oclock, and # is located at 11 oclock. In one embodiment, all the numbers and other characters are formed from a light excitable material with the same light sensitivity such that they can be turned on a with a single light source. In another embodiment, all the numbers and other characters are formed from light excitable materials with different light sensitivities such that they can be individually controlled.

Figure 25:
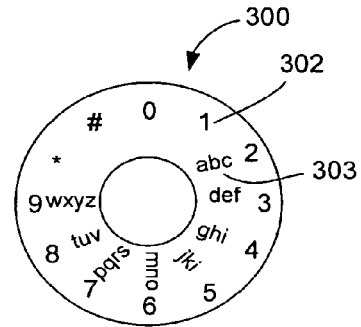
FIG. 25 is a graphical layer which can be used in a phone mode, in accordance with one embodiment of the present invention.

FIG. 25 is a variation of the embodiment shown in FIG. 24. In this embodiment, the graphics layer 300 further includes the letters 303 that go along with the numbers 302 of the phone. The numbers are placed along the outer periphery while the letters are placed at the inner periphery. In one embodiment, both the numbers and letters are formed from a light excitable material with the same light sensitivity such that they can all be turned on a with a single light source. In another embodiment, the set of numbers is formed from a first light excitable material (same light sensitivity) and the set of letters is formed a second light excitable material (same light sensitivity) that is different than the light sensitivity of the first light excitable material such that they can be individually controlled.

Figure 26:
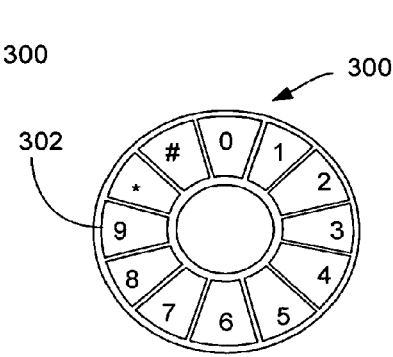
FIG. 26 is a graphical layer which can be used in a phone mode, in accordance with one embodiment of the present invention.

FIG. 26 is a variation of the embodiment shown in FIG. 24. In this embodiment, the graphics layer 300 further includes highlighting bars 304 that go along with the numbers 302 of the phone (and/or letters). The individual highlighting bars 304 surround each of the numbers and other characters 302. The numbers and other characters 302 are formed from a. first light excitable material with the same light sensitivity and each of the. highlight bars 304 are formed from light excitable materials with light sensitivities that differ from each other and the numbers and other characters 302. In this manner, the highlight bars 304 can be individually controlled.

Figure 27:
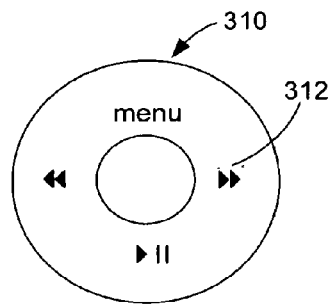
FIG. 27 is a graphical layer which can be used in a music player mode, in accordance with one embodiment of the present invention.

FIG. 27 is a graphical layer 310 which can be used in a music player mode. The graphical layer 310 includes the symbols 312 needed for navigating a music player as for example menu, <<, >> and play/pause. Each symbol is positioned in an angular manner around the graphics layer 310. Menu is at 12 oclock, >> is at 3 oclock, play/pause is at 6 oclock, and << is at 9 oclock. In one embodiment, all the symbols are formed from a light excitable material with the same light sensitivity such that they can be turned on a with a single light source. In another embodiment, all the symbols are formed from light excitable materials with different light sensitivities such that they can be individually controlled.

Figure 28:
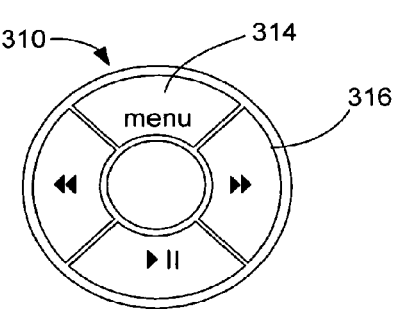
FIG. 28 is a graphical layer which can be used in a music player mode, in accordance with one embodiment of the present invention.

FIG. 28 is a variation of the embodiment shown in FIG. 27. In this embodiment, the graphics layer 310 further includes highlighting bars 316 that go along with the symbols 312. The individual highlighting bars 316 surround each of the symbols 312. The symbols 312 are formed from a first light excitable material with the same light sensitivity and each of the highlight bars 316 is formed from light excitable materials with light sensitivities that differ from each other and the symbols 312. In this manner, the highlight bars 316 can be individually controlled.

Figure 29:
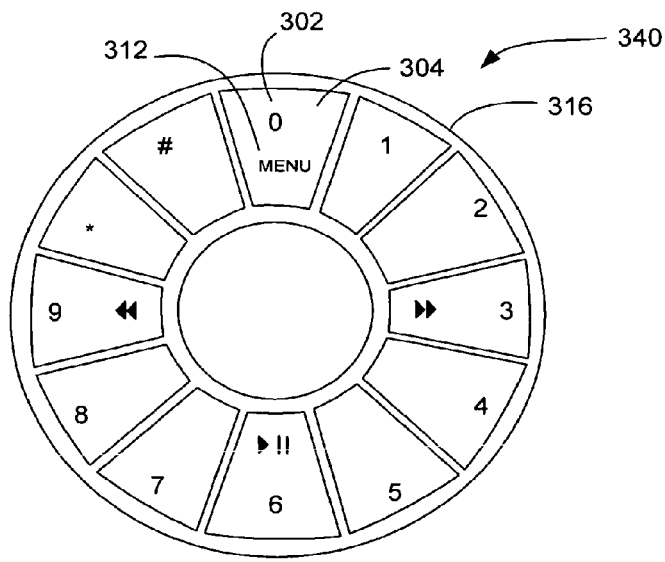
FIG. 29 is a variation of the graphical layers given above, in accordance with one embodiment of the present invention.

FIG. 29 is a variation of all the examples given above. In this embodiment, the graphics layer 340 includes the phone numbers 302 formed from light sensitive materials with the same light sensitivity, and music player symbols 312 formed from light sensitive materials with the same light sensitivity but different than the light sensitivity of the light sensitive materials of the phone numbers 302. Furthermore, the graphics layer 340 includes highlight bars 304 for each of the phone numbers 302, and highlight bars 316 for each of the music player symbols 312. Each of the highlight bars 304 and 316 are formed from light sensitive materials with light sensitivities differing from each other as well as the light sensitivities of the phone numbers and music player symbols 302 and 312.

It should be appreciated that the examples given above are by way of example and not by way of limitation. For example, graphics layers may include features associated with other modes including for example modes associated with PDA, calendaring, GPS, remote control', video, game, etc. Furthermore, the features of the graphics layers are not limited to a single graphics layer and may be applied to multiple graphical layers depending on the needs of each touch pad.

Although the touch pad can take a variety of forms using the techniques mentioned above, one particular implementation will now be described in conjunction with FIGS. 30-34.

FIGS. 30-34 are diagrams of a touch pad assembly 350, in accordance with one embodiment of the present invention. The touch pad assembly 350 includes a frame 352 and a circular touch pad 354 assembled within the frame 352. The frame 352 may be a separate component or it may be integrated or part of a housing of a handheld device. The circular touch pad 354 includes various layers including a cover 356, a light panel 358, a graphics panel 360, an electrode layer 362 and a printed circuit board (PCB) 364. The electrode layer 362 is positioned on the PCB 364. The graphics panel 360 is disposed above the electrode layer 362. The light panel 358 is disposed above the graphics panel 360. And the cover 356 is disposed above the light panel 358. The touch pad 354 further includes a button 366 disposed at the center of the touch pad 354. As such, the various layers are annular in shape.

The electrode layer 362 includes a plurality of spatially separated electrodes configured to detect changes in capacitance at an upper surface of the touch pad 354. Each of the electrodes is operatively coupled to a controller 368 located on the backside of the printed circuit board 364. During operation, the controller 368 monitors the changes in capacitance and generates signals based on these changes.

In one embodiment, various regions of the electrode layer 362 are mapped to various functions (e.g., button functions) depending on the mode of a device. During operation, if the capacitance of electrodes mapped to a region change significantly, then the function associated with the region is implemented. The mapping may be widely varied. By way of example, in a phone mode, the electrode layer 362 may be mapped in such a way so as to simulate the keys associated with a phone. In a music player mode, the electrode layer 362 may be mapped in such a way so as to simulate the buttons associated with a music player.

The graphics panel 360 is configured to generate symbols that visually indicate the meaning of the various regions when in a particular mode. The graphics panel 360 includes a light distribution panel 370 disposed over the electrode layer 362. The light distribution panel 370 is configured to redirect the light made incident thereon to light activated symbols 372. The light distribution panel 370 is also configured to serve as a dielectric layer that covers the electrode layer 362 in order to help form the capacitance sensing circuit of the touch pad 354. The light distribution panel 370 may include any number of light activated symbol 372.

In the illustrated embodiment, the light distribution panel 370 includes a first set of symbols 372A associated with a first mode and a second set of symbols 372B associated with a second mode. The symbols in each of the sets 372 are angularly dispersed around the light distribution panel 370 in a uniform and equal manner. The first set 372A is disposed around the outer periphery and the second set 372B is disposed around the inner periphery. Furthermore, the first set of symbols 372A are formed from a light sensitive material sensitive to a first wavelength of light and the second set of symbols 372B are formed from a light sensitive material sensitive to a second wavelength of light. Although the sets 372 may be widely varied, in the illustrated embodiment, the first set 372A is associated with a phone mode and the second set 372B is associated with a music player mode. As such, the first set 372A includes 0-9, * and # while the second set 372B includes menu, >>, play/pause, and <<.

It should be noted that the graphics panel is not limited to only two sets and other sets may be provided. The number of sets is typically determined by the number of modes offered by the device in which the touch pad is placed.

The graphics panel 360 also includes separate light emitting diode(s) 374A and 374B dedicated to each set of symbols 372. The light emitting diodes 374 are positioned next to the light distribution panel 370 so that light generated therefrom can be directed into the light distribution panel 370 and ultimately to the light activated symbols 372. The light emitting diodes 374 may for example be placed in the center area provided by the annular shape. The light emitting diodes 374 are configured to generate non visible light such as ultraviolet or infrared light in the wavelength needed to drive the set of the symbols associated therewith. In the illustrated embodiment, the first light emitting diode(s) 374A are configured to generate non visible light having the first wavelength, and the second light emitting diode(s) 374B are configured to generate non visible light having a second wavelength. As shown, the LEDs 374 are attached to the printed circuit board 364 and operatively coupled to the controller 368 located on the backside of the printed circuit board 364. During operation, the controller 368 selectively adjusts the intensity of each of the LEDs 374 to illuminate the symbols 372 in a controlled manner. By way of example, in a first mode, the first LED 374A may be turned on and the second LED 374B turned off. And in a second mode, the second LED 374B may be turned on and the first LED 374A turned off.

Although only a single graphics panel 360 is shown, it should be appreciated that this is not a limitation and that additional graphics panels may be used. For example, one or more graphics panels may be further positioned underneath the first graphics panel described above.

Referring now to the light panel 358, the light panel 358 is configured to generate light for highlighting the light activated symbols 372 that are being touched. The light panel 358 includes a light distribution panel 380 disposed over the graphics panel 360 and one or more side mounted light emitting diodes 382 disposed around the periphery of the light distribution panel 380. The side mounted light emitting diodes 382 are configured to direct light into a different portion of the light distribution panel 380. Alternatively, a light pipe may be used to direct light from an LED located away from the light distribution panel. The light distribution panel 380 is configured to redirect the light made incident thereon via the light emitting diodes 382 to an upper surface of the light distribution panel 380 thereby illuminating the touch pad surface. The light distribution panel 380 is also configured to serve as a dielectric layer that covers the electrode layer 362 in order to help form the capacitance sensing circuit of the touch pad.

As shown, the LEDs 382 are attached to the printed circuit board 364 and operatively coupled to the controller 368 located on the backside of the printed circuit board 364. During operation, the controller 368 selectively adjusts the intensity of each of the LEDs to illuminate portions of or all of the light distribution panel 380 in a controlled manner.

The light distribution panel 380 can be widely varied. In the illustrated embodiment, the light distribution panel 380 typically includes a portion that extends below the inner surface of the frame. This portion provides a light receiving area at the sides of the light distribution panel 380 for receiving light emitted by the side mounted LED's 382. Furthermore, the light distribution panel 380, which can be formed from a single or multiple layers, is typically formed from translucent or semi-translucent dielectric materials including for example plastic materials such as polycarbonate, acrylic or ABS plastic. It should be appreciated, however, that these materials are not a limitation and that any optically transmittable dielectric material may be used (the same materials can be used for the graphic panel).

Further, the light distribution panel 380 is broken up into plurality of distinct nodes 384, each of which includes its own dedicated light emitting diode 382 for individual illumination thereof. During operation, when light is released by a light emitting diode 382, the light is made incident on the side of the light distribution panel 380 at the node 384. The node 384 redirects and transmits the light from its side to an upper surface of the node 384. In order to prevent light bleeding between adjacent nodes 384, each node 384 may be optically separated by a reflecting or masking region disposed therebetween.

Each of the nodes 384 may be formed from a solid piece of material or it may be formed from a combination of elements. In one embodiment, each of the nodes 384 is formed from a translucent or semi-translucent plastic insert that when combined with the other inserts forms the light distribution panel 380. In another embodiment, each of the nodes is formed from a bundle of fiber optic strands.

The configuration of the nodes 384 including layout, shape and size may be widely varied. Because the touch pad 354 is circular in the illustrated embodiment, the nodes 384 are embodied as distinct angular segments (e.g., pie shaped). Furthermore, the number of nodes 384 is typically based on the symbol set 372 with the largest number of symbols. For example, in the illustrated embodiment, this would be twelve, one for each symbol of the phone mode. In one configuration, in order to highlight a phone number, the node corresponding to the phone number (disposed directly above) is illuminated, and in order to highlight a music symbol, multiple nodes corresponding to the music. symbol are illuminated (in the example provided, three nodes would be illuminated for each music symbol).

In one embodiment, all the LEDs 382 are powered at the same time to produce a fully illuminated touch pad 354. This may be analogous to backlighting. In another embodiment, the LEDs 382 are powered in accordance with the capacitance changes measured by each of the electrodes. For example, the node 384 above the detected region may be illuminated while the segments above the undetected regions may be turned off. This provides indication to the user as to their exact location on the touch surface, i.e., which symbol and thus which function will be implemented. In yet another embodiment, selected segments may be illuminated to encourage a user to place their finger in a particular area of the touch pad.

Although only a single light panel 358 is shown, it should be appreciated that this is not a limitation and that additional light panels may be used. For example, one or more light panels may be further positioned underneath the first light panel described above. In one embodiment, each light panel in a group of light panels is configured to distribute a different color. For example, three light panels including a red, green and blue light panel may be used. Using this arrangement, different colored segments may be produced. By controlling their intensity, almost any color can be produced (mixed) at the touch surface. In another embodiment, each light panel in the group of light panels may have a different orientation. For example, the angularly segmented nodes of the light distribution panel may be rotated relative to the other light panels so that they are placed at 'different positions about an axis (e.g., partially overlapping and angularly offset). Using this arrangement, leading and trailing illumination can be produced.

In most cases, some component of the touch pad 354 includes light diffusing elements to diffuse the light produced therefrom in order to normalize the light intensity, to produce a characteristic glow, and/or to hide the physical parts of the touch pad 354 located underneath the input surface. By way of example, the component may be the light distribution panel 380 of the light panel or the cover 356 disposed thereover. The light diffusing elements may be provided on an inner surface, outer surface of the component or they may be embedded inside the component. In one embodiment, the light diffusing element is an additive disposed inside the light distribution panel. In another embodiment, the light diffusing element is a layer, coating and/or texture that is applied to the inner, side or outer surfaces of the panel.

In the illustrated embodiment, the light diffusing element is disposed in the cover 356. The cover 356 may for example be a label adhered to the top surface of the light distribution panel 380. The cover label may be formed from transparent or semitransparent dielectric materials such as Mylar or Polycarbonate or any other dielectric material that is thin, optically transmittable and includes some sort of light diffusing means.

Referring to the button 366, both the light distribution panel 370 and 380 as well as the electrode layer 362 have an annular shape that creates a void at the center of the touch pad 354 for placement for the button 366. The button 366 includes a translucent button cap 390 that is movable trapped between the cover 356 and a spring loaded switch 392. The switch 392 is mounted to the printed circuit board 364 and operatively coupled to the controller 368. When the button cap 390 is pressed, it moves against the actuator of the spring loaded switch 392 thereby generating a button event that is read by the controller 368. The button cap 390 may be illuminated with an LED 394 to indicate when a signal has been read by the controller 368. Furthermore, the button cap 390 may include a graphical layer 396 with one or more symbols that are driven by dedicated light emitting diodes 398A and 398B similar to the graphical panel 360 described above. In the illustrated embodiment, the graphical layer 396 includes a first symbol 399A associated with a first mode (e.g., phone) and a second symbol 399B associated with a second mode (e.g., music notes).

In accordance with one embodiment, the functionality of a button (or buttons) is also incorporated directly into the touch pad 354 such that the touch pad 354 acts like a button along with its touch sensing capabilities. That is, the touch pad 354 forms a platform that can be clicked relative to the frame 352 in order to activate one or more actuators such as switches.

To elaborate, the touch pad 354 is capable of moving relative to the frame 352 so as to create a clicking action at various regions of the touch pad 354. The clicking actions are generally arranged to actuate one or more movement indicators 402 contained inside the frame 352. That is, a portion of the touch pad 354 moving from a first position (e.g., upright) to a second position (e.g., depressed) is caused to actuate a movement indicator 402. The movement indicators 402 are configured to sense movements of the touch pad 354 during the clicking action and to send signals corresponding to the movements to the host device. By way of example, the movement indicators 402 may be switches, sensors and/or the like.

Because the touch pad 354 is used for different modes that require different inputs, the largest set of inputs is typically used as the base for determining the number of movement indicators 402. This may be done for signal purposes (although not a requirement) and/or for stability reasons (provide the same feel to each zone). In the illustrated embodiment, the touch pad 354 includes a movement indicator 402 for each of the regions required for a phone mode. That is, there is a movement indicator 402 disposed beneath each of the phone numbers and characters.

The movements of the touch pad 354 may be provided by various rotations, pivots, translations, flexes and the like. In one embodiment, the touch pad 354 is configured to gimbal relative to the frame 352 so as to generate clicking actions for each of the button zones. By gimbal, it is generally meant that the touch pad is able to float in space relative to the frame while still being constrained thereto. The gimbal may allow the touch pad 354 to move in single or multiple degrees of freedom (DOF) relative to the housing. For example, movements in the x, y and/or z directions and/or rotations about the x, y, and/or z axes $\theta x$ $\theta y$ $\theta z$).

The movement indicators 402 may be widely varied, however, in this embodiment they take the form of mechanical switches. The mechanical switches are typically disposed between the circuit board 364 and the frame 352. The mechanical switches may be attached to the frame 352 or to the printed circuit board 364. A stiffening plate may be provided to stiffen the circuit board. In the illustrated embodiment, the mechanical switches are attached to the backside of the circuit board 364 and operatively coupled to the controller thus forming an integrated unit. They are generally attached in location that places them beneath the appropriate button zone (e.g., beneath each of the phone numbers or characters). As shown, the mechanical switches include actuators that are spring biased so that they extend away from the circuit board 364. As such, the mechanical switches act as legs for supporting the touch pad 354 in its upright position within the frame 352 (i.e., the actuators rest on the frame). By way of example, the mechanical switches may correspond to tact switches and more particularly, enclosed SMT dome switches (dome switch packaged for SMT).

Moving along, the integrated unit of the touch pad 354 and switches 402 is restrained within a space provided in the frame 352. The integrated unit is capable of moving within the space while still being prevented from moving entirely out of the space via the walls of the frame 352. The shape of the space generally coincides with the shape of the integrated unit. As such, the unit is substantially restrained along the X and Y axes via a side wall of the frame and along the Z axis and rotationally about the X and Y axis via a top wall and a bottom wall of the frame. A small gap may be provided between the side walls and the platform to allow the touch pad 354 to move to its four positions without obstruction (e.g., a slight amount of play). In some cases, the circuit board may include tabs that extend along the X and Y axis so as to prevent rotation about the Z axis. Furthermore, the top wall includes an opening for providing access to the touch sensitive surface of the touch pad 354. The spring force provided by the mechanical switches 402 places the touch pad 354 into mating engagement with the top wall of the frame 352 (e.g., upright position) and the gimbal substantially eliminates gaps and cracks found therebetween.

Figure 35:
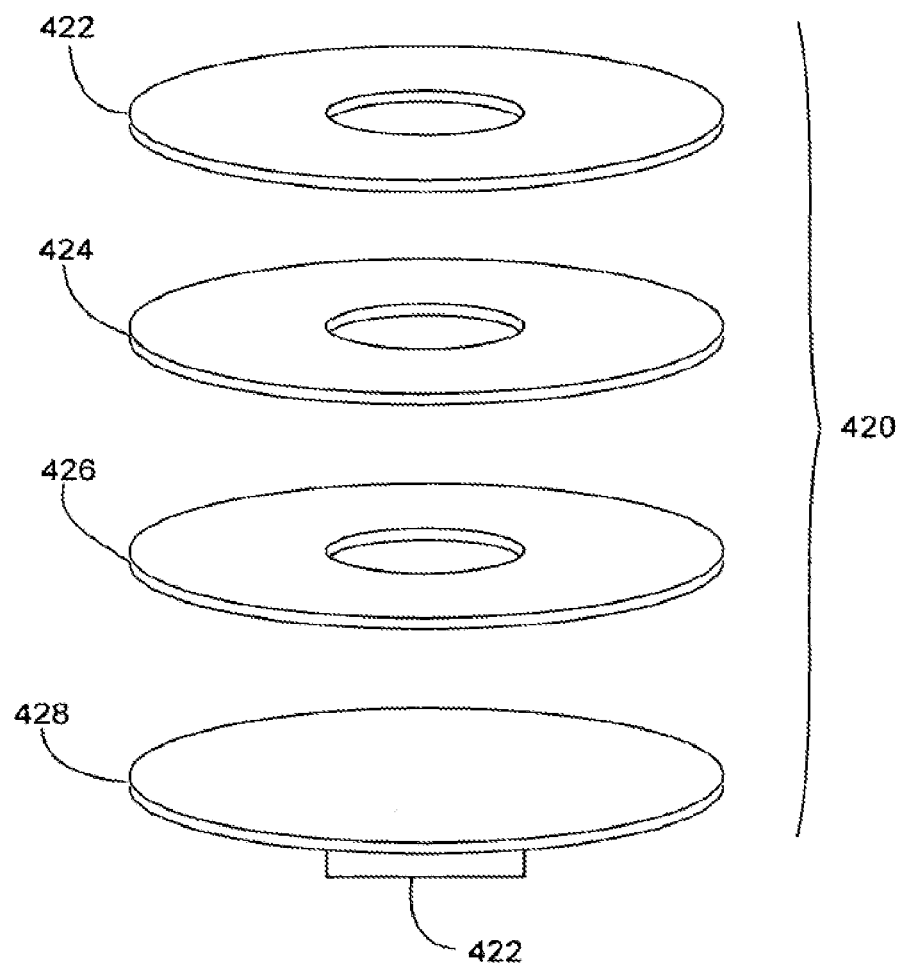
FIG. 35 is an exploded perspective diagram of a touch pad, in accordance with one embodiment of the present invention.

FIG. 35 is an exploded perspective diagram of a touch pad 420, in accordance with one embodiment of the present invention. The touch pad 420 may be a stationary fixed touch pad or a it may be integrated into a clickable touch pad. The touch pad 420 includes various layers including a light diffusing cover 422, a transparent touch sensing layer 424, an organic light emitting device (OLED) 426, and a printed circuit board 428. The light diffusing cover 422 is disposed over the touch sensing layer 424, the touch sensing layer 424 is disposed over the OLED 426, and the OLED 426 is disposed over the printed circuit board 428. The touch sensing layer 424 and OLED 426 are operatively coupled to a controller 430 located on the printed circuit board 428. The controller receive data from the touch sensing layer and instructs the OLED how to present graphical information. The graphical information may be based on the touch data. The touch sensing layer 424 may include its own carrier or it may be applied to the bottom surface of the cover 422 and/or the top surface of the OLED 426. In the illustrated embodiment, the touch pad 420 is circular. Furthermore, the circular touch pad 420 may include a button and therefore it may further include circularly annular OLED 426, circularly annular touch sensing layer 424, and a circularly annular cover 422 to provide space for the button.

While this invention has been described in terms of several preferred embodiments, there are alterations, permutations, and equivalents, which fall within the scope of this invention. For example, although the invention was primarily directed at a circular touch pad, it should be appreciated that this is not a limitation and that the principles disclosed herein may equally applied to other shaped touch pads. It should also be noted that there are many alternative ways of implementing the methods and apparatuses of the present invention. For example, with regards to light based touch pads, the light 'sources may be integrated with touch sensing nodes as described in U.S. patent application Ser. No. 11/483,008, which is herein incorporated by reference. It is therefore intended that the following appended claims be interpreted as including all such alterations, permutations, and equivalents as fall within the true spirit and scope of the present invention.

What is claimed is:

1. A clickable trackpad, including:
   a touch surface configured for detecting multiple touches occurring on the trackpad at about the same time;
   at least one depressible mechanical button capable of being activated by pressure at the touch surface; and
   a processor capable of
      designating a plurality of regions on the touch surface as click regions,
      detecting a mechanical click of the trackpad due to an application of pressure anywhere on the touch surface, the mechanical click itself being nondeterminative of a location of a touch on the touch surface,
      detecting a touch at about the same time as the detection of the mechanical click,
      determining the click region at which the touch was detected, and
      determining an operation to be performed in accordance with the determined click region.

2. The clickable trackpad of claim 1, wherein the touch surface is unmarked.

3. The clickable trackpad of claim 1, the processor further capable of allocating an area of one or more of the click regions in accordance with button usage patterns.

4. The clickable trackpad of claim 1, the processor further capable of allocating a location of one or more of the click regions in accordance with button usage patterns.

5. The clickable trackpad of claim 1, the processor further capable of dynamically designating the one or more click regions in accordance with current device usage.

6. The clickable trackpad of claim 1, the processor further capable of triggering a left-click action upon the detection of the touch and mechanical click if the particular click region is a primary click region in the touch sensor panel.

7. The clickable trackpad of claim 1, the processor further capable of triggering a right-click action upon the detection of the touch and mechanical click if the particular click region is a secondary click region in the touch sensor panel.

8. A method of initiating an operation on a clickable trackpad having at least one depressible mechanical button, including:
   configuring a touch surface of the trackpad to detect multiple touches occurring at about the same time;
   designating a plurality of regions on the touch surface as click regions,
   detecting a mechanical click of the trackpad due to an application of pressure anywhere on the touch surface, the mechanical click itself being nondeterminative of a location of a touch on the touch surface,
   detecting a touch at about the same time as the detection of the mechanical click,
   determining the click region at which the touch was detected, and
   determining an operation to be performed in accordance with the determined click region.

9. The method of claim 8, wherein the touch surface is unmarked.

10. The method of claim 8, further including allocating an area of one or more of the click regions in accordance with button usage patterns.

11. The method of claim 8, further including allocating a location of one or more of the click regions in accordance with button usage patterns.

12. The method of claim 8, further including dynamically designating the one or more click regions in accordance with current device usage.

13. The method of claim 8, further including triggering a left-click action upon the detection of the touch and mechanical click if the particular click region is a primary click region in the touch sensor panel.

14. The method of claim 8, further including triggering a right-click action upon the detection of the touch and mechanical click if the particular click region is a secondary click region in the touch sensor panel.

15. A clickable trackpad, including:
   means for triggering a click of the trackpad;
   means for configuring a touch surface of the trackpad to detect multiple touches occurring at about the same time;
   means for designating a plurality of regions on the touch surface as click regions,
   means for detecting a mechanical click of the trackpad due to an application of pressure anywhere on the touch surface, the mechanical click itself being nondeterminative of a location of a touch on the touch surface,
   means for detecting a touch at about the same time as the detection of the mechanical click,
   means for determining the click region at which the touch was detected, and
   means for determining an operation to be performed in accordance with the determined click region.

16. The clickable trackpad of claim 15, wherein the touch surface is unmarked.

17. The clickable trackpad of claim 15, further including means for allocating an area of one or more of the click regions in accordance with button usage patterns.

18. The clickable trackpad of claim 15, further including means for allocating a location of one or more of the click regions in accordance with button usage patterns.

19. The clickable trackpad of claim 15, further including means for dynamically designating the one or more click regions in accordance with current device usage.

20. The clickable trackpad of claim 15, further including:
   triggering a left-click action upon the detection of the touch and mechanical click if the particular click region is a primary click region in the touch sensor panel, and
   triggering a right-click action upon the detection of the touch and mechanical click if the particular click region is a secondary click region in the touch sensor panel.

* * * * *